US009778340B2

(12) United States Patent
Mutz et al.

(10) Patent No.: US 9,778,340 B2
(45) Date of Patent: Oct. 3, 2017

(54) DEVICE AND METHOD FOR LOCATION OF AN RFID TRANSMITTER

(75) Inventors: Matthieu Mutz, Caen (FR); Stéphane Mutz, Cuverville (FR)

(73) Assignee: BLINKSIGHT (FR)

( * ) Notice: Subject to any disclaimer, the term of this patent is extended or adjusted under 35 U.S.C. 154(b) by 280 days.

(21) Appl. No.: 14/410,948

(22) PCT Filed: Jun. 29, 2012

(86) PCT No.: PCT/FR2012/051507
§ 371 (c)(1),
(2), (4) Date: Dec. 23, 2014

(87) PCT Pub. No.: WO2014/001651
PCT Pub. Date: Jan. 3, 2014

(65) Prior Publication Data
US 2015/0323642 A1  Nov. 12, 2015

(51) Int. Cl.
*G01S 3/74* (2006.01)
*G06K 7/10* (2006.01)
*H04B 7/08* (2006.01)

(52) U.S. Cl.
CPC ............ *G01S 3/74* (2013.01); *G06K 7/10009* (2013.01); *H04B 7/08* (2013.01)

(58) Field of Classification Search
CPC ..... G01S 3/74; G01S 3/14; G01S 3/46; G01S 5/0215; G01S 5/0221; G01S 5/04;
(Continued)

(56) References Cited

U.S. PATENT DOCUMENTS 4,229,821 A * 10/1980 de Jager ............. H04L 27/2017
                                                                 375/280
4,856,027 A *  8/1989 Nakamura .......... H04L 27/2273
                                                                 329/308
(Continued)

FOREIGN PATENT DOCUMENTS

EP      1610258 A1   12/2005
WO      0025147 A2    5/2000

OTHER PUBLICATIONS

International Search Report for Application No. PCT/FR2012/051507 dated May 3, 2013.

*Primary Examiner* — Bernarr Gregory
*Assistant Examiner* — Nuzhat Pervin
(74) *Attorney, Agent, or Firm* — Lerner, David, Littenberg, Krumholz & Mentlik, LLP

(57) ABSTRACT

A device for locating a remote RFID transmitter in an environment providing separate paths of propagation of a wirelessly transmitted ultra-wide band signal. The receiver of the device has a module for estimating the impulse response of the plurality of paths of the first channel defined by a first antenna and a module for estimating the impulse response of the plurality of paths of the second channel defined by the second antenna, a module for calculating a plurality of argument differences between each component of the impulse response and each component of the impulse response for the plurality of paths respectively. The device further comprises a module for converting the plurality of argument differences into a plurality of arrival angles of the plurality of paths, a module for determining a location of the transmitter from the plurality of arrival angles.

23 Claims, 7 Drawing Sheets

Figure 1:
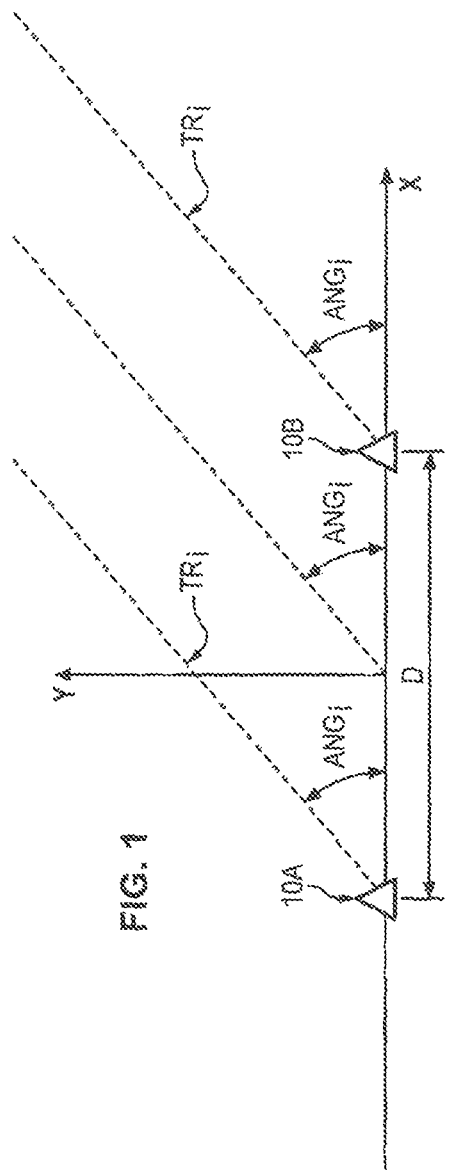

(58) Field of Classification Search
CPC .......... G01S 5/06; G01S 13/003; G01S 13/46;
G01S 13/48; G01S 13/9023; G01S 4/04;
G01S 13/89; G01S 3/16; G01S 1/24;
G06K 7/10009; H04B 7/08; H04B 1/00;
H04B 17/00; H04B 1/10; H04B 1/38;
H04B 1/04; H04L 1/00; H04L 12/26;
H04L 27/22; H04L 27/06; H04J 4/00;
H01Q 3/00; H01Q 7/00; H03K 9/00;
H03D 1/00; H01M 1/00
USPC ........................................................ 342/417
See application file for complete search history.

(56) References Cited

U.S. PATENT DOCUMENTS

| | | | | |
|---|---|---|---|---|
| 5,265,121 | A * | 11/1993 | Stewart | H04B 1/713 375/343 |
| 6,104,346 | A * | 8/2000 | Rudish | G01S 3/04 342/156 |
| 6,760,387 | B2 | 7/2004 | Langford et al. | |
| 7,030,811 | B2 * | 4/2006 | Goren | G01S 1/026 342/387 |
| 7,352,721 | B2 * | 4/2008 | Kim | H01Q 1/1257 370/334 |
| 7,474,219 | B2 | 1/2009 | Richards et al. | |
| 8,116,350 | B1 * | 2/2012 | Arndt | G01S 5/04 342/126 |
| 8,179,816 | B1 * | 5/2012 | Vaidyanathan | G01S 1/024 370/252 |
| 8,208,587 | B2 * | 6/2012 | Chong | G01S 3/043 375/340 |
| 8,217,760 | B2 * | 7/2012 | Wild | G01S 3/14 340/10.1 |
| 8,559,456 | B2 * | 10/2013 | Woodsum | H04B 7/086 370/464 |
| 8,837,574 | B2 * | 9/2014 | Farine | H04B 1/71637 375/239 |
| 9,453,905 | B2 * | 9/2016 | Smith | G01S 5/0273 |
| 2003/0058963 | A1 * | 3/2003 | Cattaneo | H04B 1/7183 375/316 |
| 2006/0148429 | A1 * | 7/2006 | Inogai | H04B 17/0087 455/115.1 |
| 2006/0244660 | A1 * | 11/2006 | Ann | G01S 3/74 342/377 |
| 2007/0264939 | A1 * | 11/2007 | Sugar | H04B 17/309 455/67.11 |
| 2008/0197982 | A1 | 8/2008 | Sadr | |
| 2010/0271263 | A1 * | 10/2010 | Moshfeghi | G01S 5/0263 342/378 |
| 2010/0309051 | A1 | 12/2010 | Moshfeghi | |
| 2011/0090813 | A1 | 4/2011 | Kisigami et al. | |
| 2013/0184002 | A1 * | 7/2013 | Moshfeghi | G01S 5/0263 455/456.1 |
| 2014/0066757 | A1 * | 3/2014 | Chayat | G01S 13/89 600/430 |

* cited by examiner

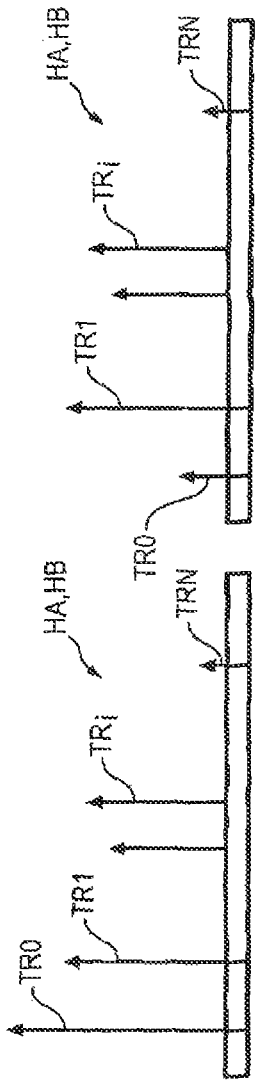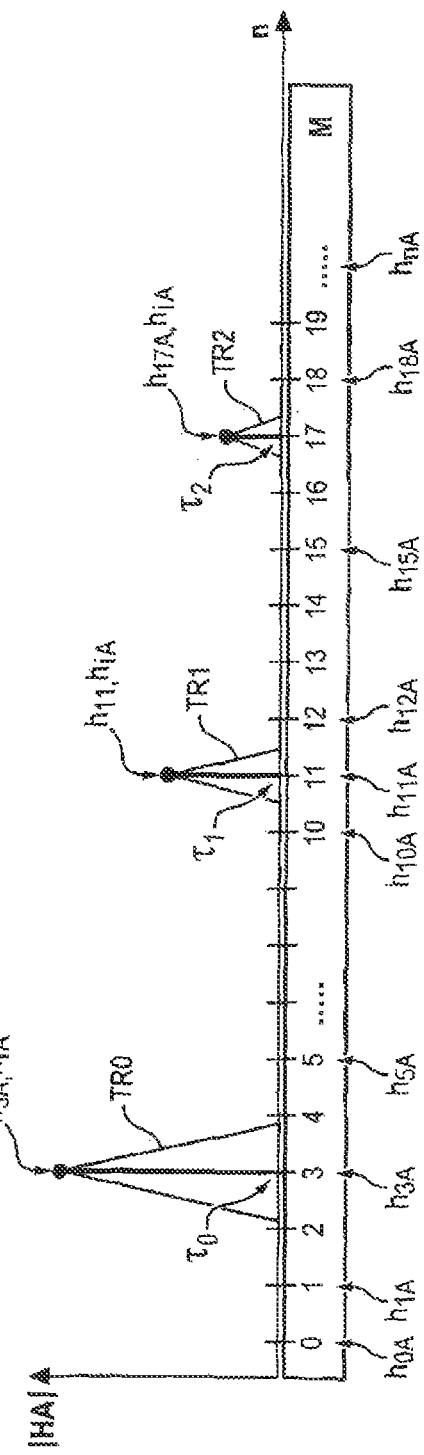

DEVICE AND METHOD FOR LOCATION OF AN RFID TRANSMITTER

CROSS REFERENCE TO RELATED APPLICATIONS

The present application is a national phase entry under 35 U.S.C. §371 of International Application No. PCT/FR2012/051507, filed Jun. 29, 2012, published in French, the disclosure of which is incorporated by reference herein.

The invention relates to a device for location of a remote transmitter.

A field of application of the invention is the location of objects, or persons, wearing a transmitter emitting a signal which is detected for locating them.

The invention applies to those fields needing measurement by a base station of known position of the direction in which a mobile transmitter of unknown position is located.

An example of application of the invention is the location of objects and/or of persons in one or more buildings, and can be in the field of logistics, by example for locating articles in a depot, a building, a shop or the like. This example of application can require location on a plane (2D environment) or in space (3D environment).

Real-Time Location Systems (RTLS) are an example of such a field of application.

The aim of such a system is to follow in time real the position of a large number of objects or persons inside a building. These systems utilise radio waves to locate mobile transmitters by means a network of base stations whereof the position is predetermined.

The transmitter is especially an RFID transmitter, such as for example an RFID tag, RFID meaning "radio frequency identification".

RTLS systems utilise wireless radio communications for estimating the relative position of the mobile element relative to base stations located at reference points whereof the position is known.

Document US-A-2008/019 79 82 A1 discloses a transmitter with RFID tag to a receiver having a receiving antenna. The receiver comprises a decoder, which estimates the impulse response of the channel of the antenna, for estimating the phase of the signal received by the antenna and decoding data transmitted by the RFID tag, by eliminating interferences due to multiple paths due to the reflections on the walls of a building.

Document US-A-2010/0309051 describes a system for estimating the position of a mobile unit, for receiving at the mobile unit a signal having multiple paths, which can be of UWB type, emitted by transmitters, for calculating first parameters characterising the communication channel as a function of signals received, for extracting from a database second parameters corresponding to locations, and comparing the first parameters to the second parameters for determining the position of the mobile unit.

Document US-A-2010/0271 263 describes a system for estimating the position of a mobile unit, for receiving via several antennas on the mobile unit a signal which can be of UWB and RFID type, emitted by transmitters, correlation with a preamble of the emitted signal being used for calculating the time of flight of the signal between the transmitters and the mobile unit.

Document US-A-2011/0090813 describes a receiver having several antennas, calculating a direction of arrival of an incident wave by using correlation with a pilot signal contained in the signal received.

Document U.S. Pat. No. 7,474,219 describes a system for location of persons or objects having radiofrequency tags, the system comprising receivers for receiving the emitted signal by the tag and making intercorrelation between the signal received and a coded signal, for determining the position of the tag on the base of the angle of arrival calculated by each receiver.

Document U.S. Pat. No. 6,760,387 describes a system for determining the position of a transmitter, the system comprising a receiver having two antennas for determining the angle of arrival of pulse signals received at the antennas, which can be of UWB type, by using intercorrelation between the signal received and a coded signal.

Document EP-A-1 610 258 describes a location device of a remote RFID transmitter in an environment acquiring a plurality of separate paths for propagation of a signal emitted wirelessly by the transmitter, the device comprising at least one receiver having at least one first receiving antenna of the emitted signal and at least one second receiving antenna of the emitted signal, the first antenna and the second antenna being connected respectively to a first receiving path supplying a first reception signal as a function of the emitted signal and a second receiving path supplying a second reception signal as a function of the emitted signal. The device known from document EP-A-1 610 258 calculates the direction of arrival of the signal emitted by the tag by providing different weights to the signals received by the antennas.

Document WO 00/25 147 describes a receiver with two antennas calculating an angle of arrival of a radio wave by using detection of the rising edge and zero crossings of a carrier of intermediate frequency. The inventors noted that the principle of detection implemented by document WO 00/25147 disallows operation in low signal-to-noise conditions, since it needs detection of energy in the analog field.

One of the problems arising when the device is used in an environment comprising walls or more generally in a closed environment relative to the exterior, here called internal environment, such as for example typically in buildings, is the existence of parasite reflections of the emitted signal on the walls, outside walls, floors and ceilings, inter alia. These reflections create multiple paths of the emitted signal. So, a receiver fitted with an antenna having to receive the emitted signal receives not only the direct path going from the transmitter to the antenna, but also indirect paths coming from one or more reflections of the emitted signal on elements of the environment. These multiple paths tend to unfavourably scramble the location of the transmitter by one or more receivers.

Some known location techniques utilise ultra-wide band pulse signals, also known under the acronym UWB, which are reputed to have greater robustness to interference. Radio transmissions of UWB signals function by emission of electromagnetic pulses of highly limited duration (of the order of a nanosecond) separated by periods of silence. In narrow band approaches, which employ pulses of longer duration or even signals with continuous carrier, the internal propagation environment plays a considerable negative role which modifies the properties of the signal received and which makes particularly difficult for fine estimation of the propagation time. Relative to narrow-band signals, the very short duration of pulses UWB (typically 2 ns for a bandwidth of 500 MHz) contributes a very fine temporal resolution.

Because of the short duration of the pulses which they contain, the signals of UWB type occupy a wide frequency band, typically of around 500 MHz or more. Regulatory authorities such as the FCC in the USA have authorised the use of UWB signals in frequency ranges from 3.1 to 10.6 GHz. The emission power of UWB signals is limited to an average of −41.3 dBm/MHz.

Therefore, for signals of UWB type also, the very low power emission, by comparison to 20 dBm authorised for a signal of "Wi-Fi" type, involves very low levels of signal-to-noise ratio on reception. The pulses of the UWB signal sensed by an antenna located some ten meters from the transmitter are generally masked by ambient noise, making their detection particularly delicate.

To allow communication in these conditions, use is often made of coherent receivers which integrate the energy of a multitude of pulses to discern the latter from the ambient noise by accumulation of a greater quantity of energy from the signal.

To produce a location system, two techniques widely used among others are known from the prior art: one known as trilateration and one known as triangulation. Operating three-dimensional positioning solely on the basis of a trilateration system requires positioning of receiving base stations at different heights, including near the floor where the probability of obstruction of the direct path is very important. A triangulation system allows to install the base stations exclusively in the ceiling, increasing the probability of a direct path unobstructed between the transmitter and the base stations.

The absolute precision of a triangulation positioning system is based exclusively on the capacity to measure with precision an angle of arrival at each of the anchoring points.

The aim of the invention is to produce a location device of a remote transmitter in an environment involving a plurality of separate paths for propagation of a signal emitted wirelessly by the transmitter, which eliminates the disadvantages of the prior art and which has improved precision, including in low signal-to-noise ratio conditions, and has minimal execution complexity.

Figure 2:
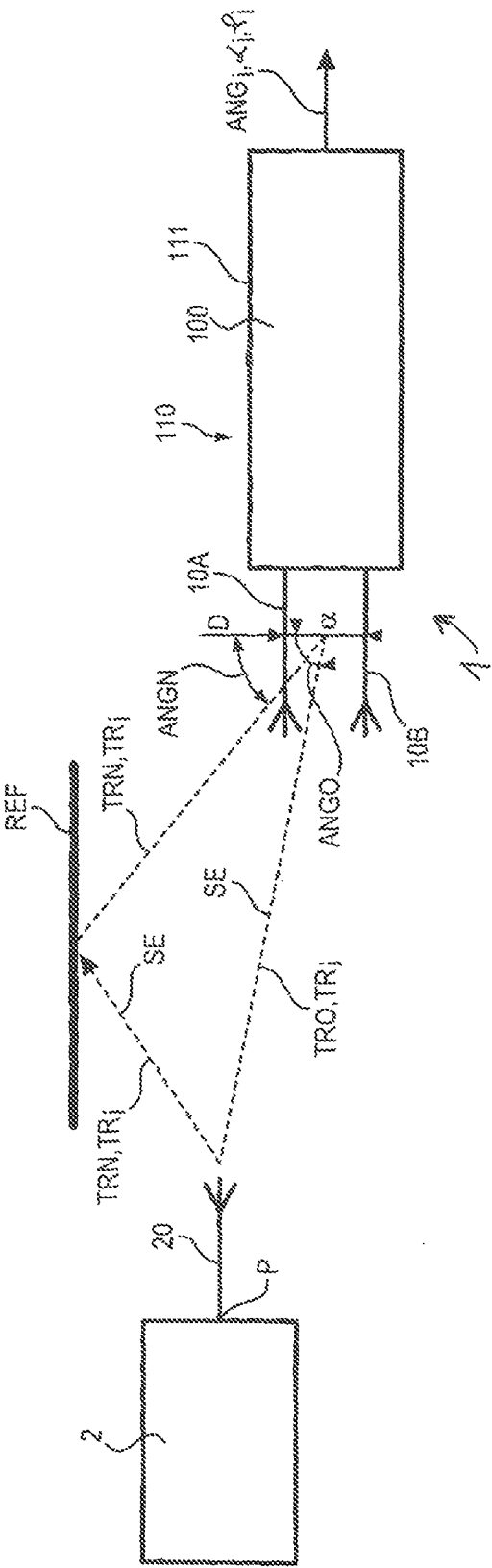
Figure 3:
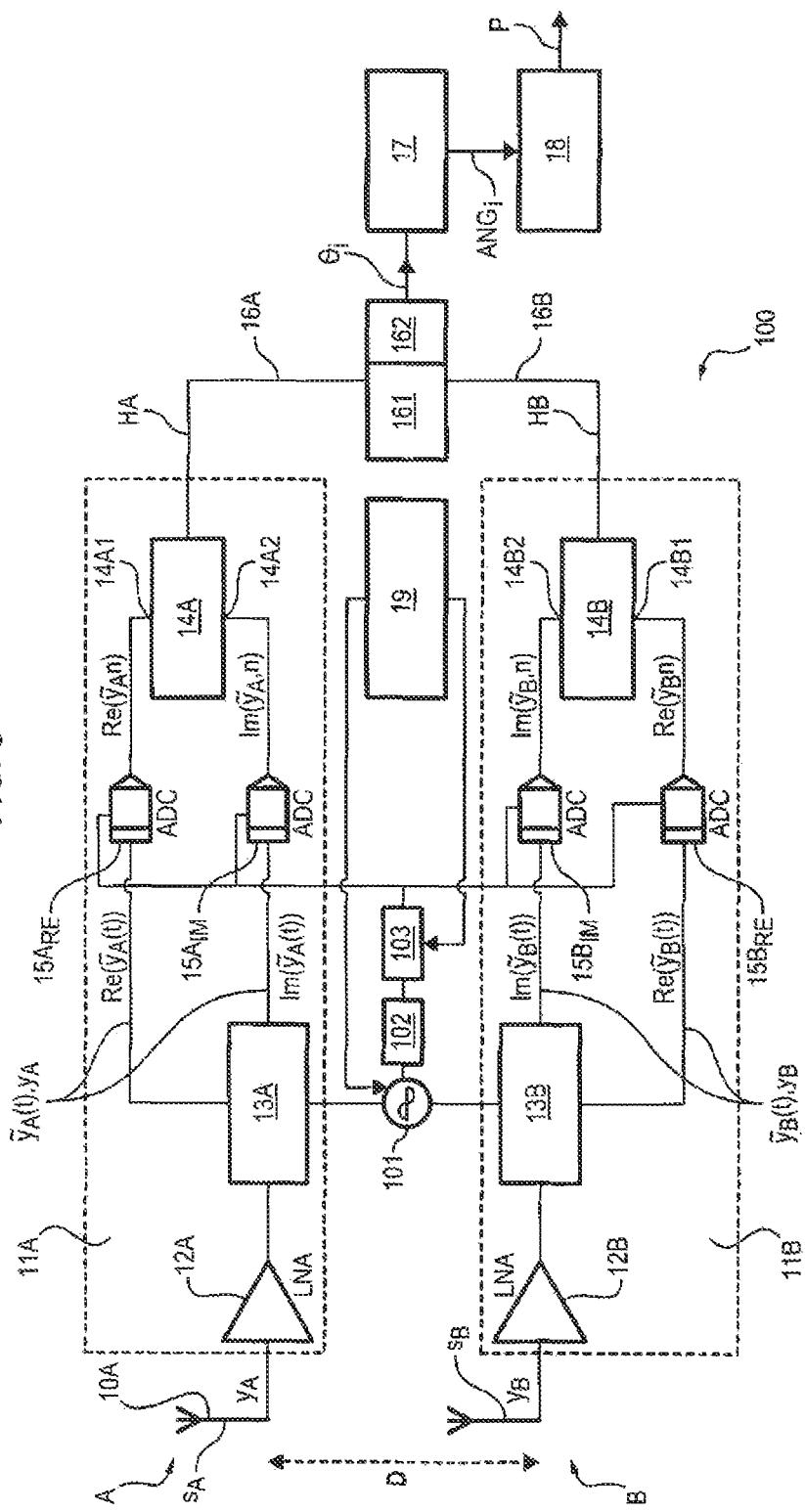
Figure 8:
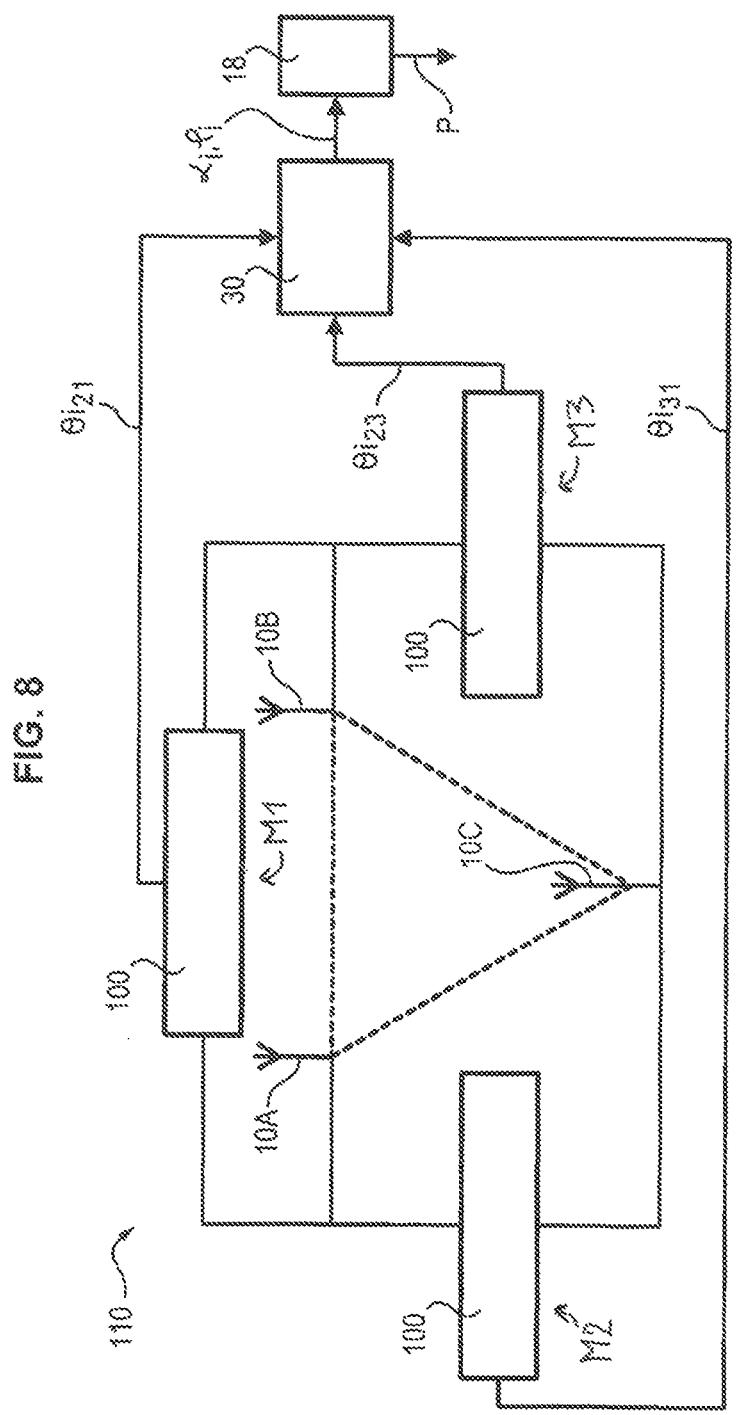

For this purpose, a first object of the invention is, as shown on FIGS. 2, 3 and 8, a device for location of a distant RFID transmitter (2) in an environment involving a plurality of separate paths (TRi) for propagation of a signal (SE) emitted wirelessly by the transmitter (2), the device comprising at least one receiver (100, M1, M2, M3) connected to at least one first antenna (10A) for receiving of the emitted signal (SE) and to at least one second antenna (10B) for receiving of the emitted signal (SE), the first antenna (10A) and the second antenna (10B) being connected in the receiver (100, M1, M2, M3) to respectively a first receiving path (11A) supplying a first path signal (yA) as a function of the emitted signal (SE) and a second receiving path (11B) supplying a second path signal (yB) as a function of the emitted signal (SE), characterized in that the signal (SE) emitted wirelessly by the transmitter is of the ultra-wide band type, the first antenna (10A) defining a first receiving channel (A) for receiving of the emitted signal (SE) according to the plurality of paths (TRi), the second antenna (10B) defining a second receiving channel (B) for receiving of the emitted signal (SE) according to the plurality of paths (TRi), the first antenna (10A) and the second antenna (10B) being at a distance from each other and respectively having first and second predetermined positions relative to each other, such that the first receiving channel (A) is substantially identical to the second receiving channel (B), the receiver (100, M1, M2, M3) further comprises a first estimation module (14A) for estimation of the first impulse response (HA) of the first channel (A) having the plurality of paths (TRi) to the emitted signal (SE) as a function of the emitted signal (SE) and of the first path signal (yA), a second estimation module (14B) for estimation of the second impulse response (HB) of the second channel (B) having the plurality of paths (TRi) to the emitted signal (SE) as a function of the emitted signal (SE) and of the second path signal (yB), a third extraction module (161) for extracting from the first impulse response (HA) a plurality of first components associated respectively with the plurality of paths (TRi) arriving at the first antenna (10A) and for extracting from the second impulse response (HB) a plurality of second components associated respectively with the plurality of paths (TRi) arriving at the second antenna (10B), and a fourth module (162) for calculating a plurality of argument differences ($\theta i$) between the argument of each first component of the first impulse response (HA) and the argument of each second component of the second impulse response (HB) respectively for the plurality of paths (TRi), the device further comprising at least one conversion module (17, 30) for converting of the plurality of argument differences ($\theta i$) into a plurality of angles of arrival (ANGi; ($\alpha i$, $\phi i$)) of the plurality of paths (TRi) relative to the receiver (100), the device comprising at least one module (18) for determining a location of the transmitter (2) from the plurality of angles of arrival (ANGi; ($\alpha i$, $\phi i$)) of the plurality of paths (TRi).

According to an embodiment of the invention, as shown on FIGS. 2, 3 and 8, the receiver (100, M1, M2, M3) comprises a first converter (12A, 13A) for converting of the radiofrequency signal ($s_A$) received by the first antenna (10A) into the first path signal (yA) in base band sent to the first estimation module (14A) and a second converter (12B, 13B) for converting of the radiofrequency signal ($s_B$) received by the second antenna (10B) into the second path signal (yB) in base band sent to the second estimation module (14B).

According to an embodiment of the invention, as shown on FIGS. 2, 3 and 8, the receiver (100, M1, M2, M3) comprises at least one analog-to-digital converter ($15A_{RE}$, $15A_{IM}$, $15B_{RE}$, $15B_{IM}$) for converting the first path signal (yA) in base band into the first path signal in digital base band sent to the first estimation module (14A) and for converting the second path signal (yB) in base band respectively into the second path signal in digital base band sent to the second estimation module (14B).

According to an embodiment of the invention, as shown on FIGS. 2, 3, 5 and 8, the first estimation module (14A) calculates the first impulse response (HA) by making a correlation between the first path signal (yA which can be in digital base band) and a signal (CCAL) calculated by circular permutations of a sequence contained in the emitted signal (SE), the second estimation module (14B) calculates the second impulse response (HB) by making a correlation between the second path signal (yB which can be in digital base band) and the signal (CCAL) calculated by circular permutations of the sequence contained in the emitted signal (SE).

According to an embodiment of the invention, as shown on FIG. 2, said sequence contained in the emitted signal (SE) is pre-registered in the receiver (100).

According to an embodiment of the invention, as shown on FIG. 2, said sequence contained in the emitted signal (SE)

is a sequence of pulses present in a synchronisation heading of a preamble of the emitted signal (SE).

According to an embodiment of the invention, as shown on FIGS. 2 and 3, the conversion module (17) calculates the plurality of angles of arrival ANGi of the plurality of paths relative to the receiver (100) according to the following equation:

$$ANGi = \arccos((\arg(hiA) - \arg(hiB)) \cdot c / (\omega \cdot D)),$$

where
$\arg(hiA) - \arg(hiB)$ is the plurality of argument differences ($\theta i$) between the argument $\arg(hiA)$ of each first component of the first impulse response (HA) and the argument $\arg(hiB)$ of each second component of the second impulse response (HB) respectively for the plurality of paths (TRi),
$\omega$ is the pulsation corresponding to a central emission frequency of the emitted signal (SE),
D is a separation distance between the first antenna (10A) and the second antenna (10B),
c is the speed of light.

According to an embodiment of the invention, as shown on FIGS. 2 and 3, the first antenna (10A) and the second antenna (10B) are at a distance from each other by a distance (D) equal to a wavelength of an emission frequency (for example central pulsation) of the emitted signal (SE).

According to an embodiment of the invention, as shown on FIG. 3, the conversion module (17) converts the plurality of argument differences ($\theta i$) into a plurality of angles of arrival (ANGi) in a determined two-dimensional plan.

According to an embodiment of the invention, as shown on FIGS. 2 and 3, the receiver comprises as antennas only a single first antenna (10A) and a single second antenna (10B).

According to another embodiment of the invention, as shown on FIGS. 2, 3 and 8, the conversion module (30) converts the plurality of argument differences ($\theta i$) into a plurality of three-dimensional angles of arrival ($\alpha i$, $\phi i$).

According this another embodiment of the invention, as shown on FIGS. 2, 3 and 8, there is at least one third antenna (10C) located in a third predetermined position, the first position of the first antenna (10A), the second position of the second antenna (10B) and the third position of the third antenna (10C) being non-aligned, the device comprises, as receiver (100), at least one first receiver (100, M1) connected to the first antenna (10A) and to the second antenna (10B) for calculating a plurality of first argument differences ($\theta i_{21}$) respectively for the plurality of paths (TRi), and at least one second receiver (100, M2) connected to the first antenna (10A) and to the third antenna (10C) for calculating a plurality of second argument differences ($\theta i_{31}$) respectively for the plurality of paths (TRi),
the conversion module (30) converting the plurality of first argument differences ($\theta i_{21}$) and the plurality of second argument differences ($\theta i_{31}$) respectively into a plurality of angles of arrival ($\alpha i$, $\phi i$) of the plurality of paths (TRi) relative to the receivers (M1, M2).

According to another embodiment of the invention, as shown on FIGS. 2, 3 and 8, the device further comprises, as receiver (100), at least one third receiver (100, M3) connected to the third antenna (10C) and to the second antenna (10B) for calculating a plurality of third argument differences ($\theta i_{23}$) respectively for the plurality of paths (TRi),
the conversion module (30) converting the plurality of first argument differences ($\theta i_{21}$), the plurality of second argument differences ($\theta i_{31}$) and the plurality of third argument differences ($\theta i_{23}$) respectively into a plurality of angles of arrival ($\alpha i$, $\phi i$) of the plurality of paths (TRi) relative to the receivers (M1, M2).

According to an embodiment of the invention, as shown on FIGS. 2, 3 and 8, the first and second estimation modules (14A) calculate the first and second impulse responses (HA, HB) in the form of first and second multiplicities of samples) in discrete time,
the extraction module (161) selecting the plurality of first components associated respectively with the plurality of paths (TRi) among the first multiplicity of samples of the first impulse response (HA),
the extraction module (161) selecting the plurality of second components associated respectively with the plurality of paths (TRi) among the second multiplicity of samples of the second impulse response (HB).

According to an embodiment of the invention, the extraction module (161) selects the plurality of first and second components by retaining the first and second samples which are non-zero in absolute value or greater in absolute value than a prescribed non-zero threshold.

According to an embodiment of the invention, the first multiplicity of samples $hnA = \widetilde{\widehat{H}_{A,n}}$ of the first impulse response (HA) and the second multiplicity of samples $hnB = \widetilde{\widehat{H}_{B,n}}$ of the second impulse response (HB) are calculated according to the following formulas:

$$\widetilde{\widehat{H}_{A,n}} = \sum_{k=0}^{K-1}\sum_{m=0}^{L-1} \tilde{y}_{A,(n \bmod S)+m\cdot S+k\cdot L\cdot S} \cdot C_{(L+m-\lceil \frac{n}{S} \rceil) \bmod L}$$

$$\widetilde{\widehat{H}_{B,n}} = \sum_{k=0}^{K-1}\sum_{m=0}^{L-1} \tilde{y}_{B,(n \bmod S)+m\cdot S+k\cdot L\cdot S} \cdot C_{(L+m-\lceil \frac{n}{S} \rceil) \bmod L}$$

where
n is the discrete time variable on the samples,
$C = \{C_0; C_1; \ldots C_{L-1}\}$ is a sequence of L elementary pulses of period $T_S = S \cdot T_c$ seconds between the successive pulses of the sequence C contained in the emitted signal (SE),
L is a natural non-zero integer,
mod L designates the modulo L operator,
$T_c$ is the duration of each pulse,
K is the number of repetitions of the sequence C, $$\lceil \frac{n}{S} \rceil$$

designates the integer part of n/S, rounded up to the next integer,
S is a prescribed integer,
n is a non-zero integer between 1 and L×S,
$y_{A,n} = \tilde{y}_{A,n}$ designates the samples of the complex digital signal of the first path (11A) in base band, as shown on FIG. 2,
$y_{B,n} = \tilde{y}_{B,n}$ designates the samples of the complex digital signal of the second path (11B) in base band.

According to an embodiment of the invention, as shown on FIG. 2, the receiver (100) comprises a single local oscillator (101) shared between the receiving paths (11A, 11B).

According to an embodiment of the invention, as shown on FIG. 2, the physical arrangement of the channels (11A, 11B) is done symmetrically relative to the oscillator (101) placed on the axis of symmetry.

According to an embodiment of the invention, as shown on FIG. 2, the receiver (100) comprises a single local oscillator (101) shared between the receiving paths (11A, 11B), with the physical arrangement of the converters ($15A_{RE}$, $15A_{IM}$, $15B_{RE}$, $15B_{IM}$) being done symmetrically relative to the oscillator (101) placed on the axis of symmetry.

According to an embodiment of the invention, as shown on FIGS. 2, 3 and 8, the module (18) to determine the location of the transmitter (2) calculates this location (P) of the transmitter (2) as a function of pre-registered coordinates of elements (REF) of the environment reflecting the emitted signal (SE) and as a function of the plurality of angles of arrival (ANGi; ($\alpha$i, $\phi$i)) of the plurality of paths (TRi).

A second subject matter of the invention is, as shown on FIGS. 2, 3 and 8, a method for location of a distant RFID transmitter (2) in an environment involving a plurality of separate paths (TRi) for propagation of signal (SE) emitted wirelessly by the transmitter (2), by means of the device as described above, a method in which the emitted signal (SE) is received on at least one first receiving antenna (10A) and at least one second receiving antenna (10B) of at least one receiver (100, M1, M2, M3), the first antenna (10A) and the second antenna (10B) being connected in the receiver (100, M1, M2, M3) respectively to a first receiving path (11A) supplying a first path signal (yA) as a function of the emitted signal (SE) and a second receiving path (11B) supplying a second path signal (yB) as a function of the emitted signal (SE), characterized in that the signal (SE) emitted wirelessly by the transmitter is of the ultra-wide band type, the first antenna (10A) defining a first receiving channel (A) for receiving of the emitted signal (SE) according to the plurality of paths (TRi), the second antenna (10B) defining a second receiving channel (B) for receiving of the emitted signal (SE) according to the plurality of paths (TRi), the first antenna (10A) and the second antenna (10B) being at a distance from each other and having respectively first and second predetermined positions relative to each other, such that the first receiving channel (A) is substantially identical to the second receiving channel (B), the first impulse response (HA) of the first channel (A) having the plurality of paths (TRi) to the emitted signal (SE) is estimated by the receiver (100, M1, M2, M3) as a function of the emitted signal (SE) and of the first path signal (yA), the second impulse response (HB) of the second channel (B) having the plurality of paths (TRi) to the emitted signal (SE) is estimated by the receiver (100, M1, M2, M3) as a function of the emitted signal (SE) and of the second path signal (yB), a plurality of first components associated respectively with the plurality of paths (TRi) arriving at the first antenna (10A) is extracted (161) from the first impulse response (HA) by the receiver (100, M1, M2, M3), and a plurality of second components associated respectively with the plurality of paths (TRi) arriving at the second antenna (10B) is extracted from the second impulse response (HB) by the receiver (100, M1, M2, M3), a plurality of argument differences ($\theta$i) between the argument of each first component of the first impulse response (HA) and the argument of each second component of the second impulse response (HB) respectively for the plurality of paths (TRi) is calculated by the receiver (100, M1, M2, M3), the plurality of argument differences ($\theta$i) is converted by the receiver (100, M1, M2, M3) into a plurality of angles of arrival (ANGi; ($\alpha$i, $\phi$i)) of the plurality of paths (TRi) relative to the receiver (100), a location of the transmitter (2) is determined by the device from the plurality of angles of arrival (ANGi; ($\alpha$i, $\phi$i)) of the plurality of paths (TRi).

Figure 5:
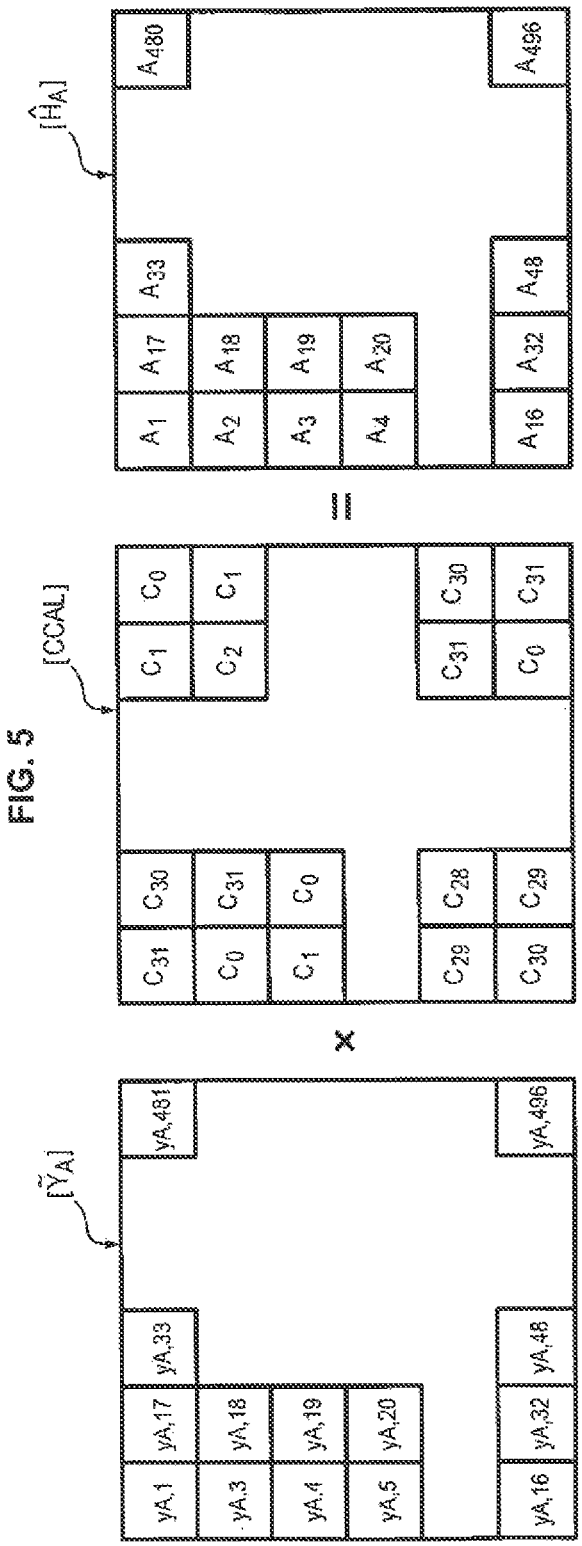
Figure 6:
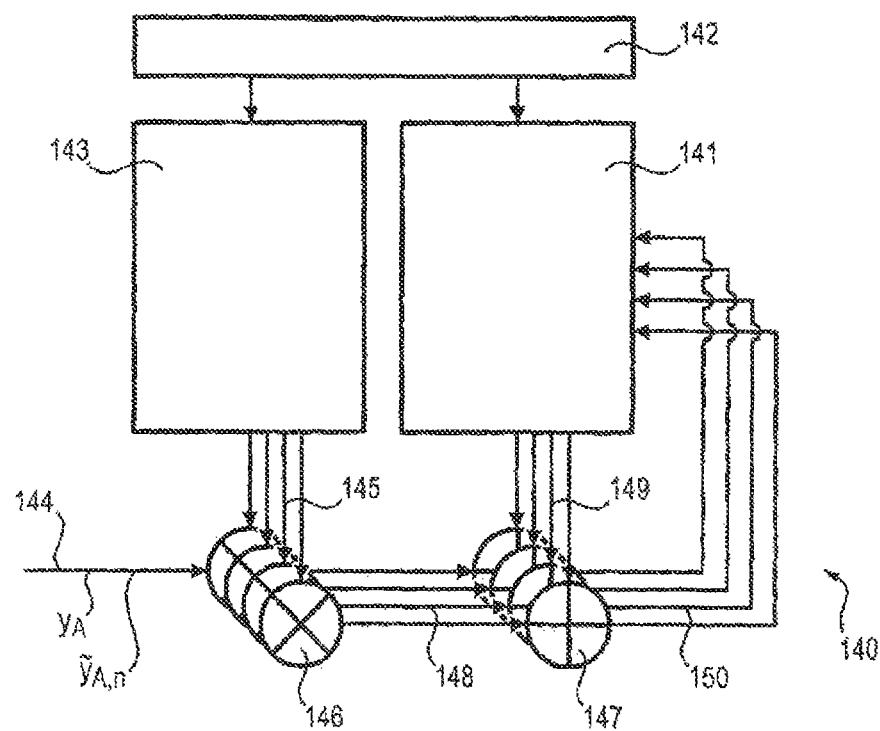
Figure 7:
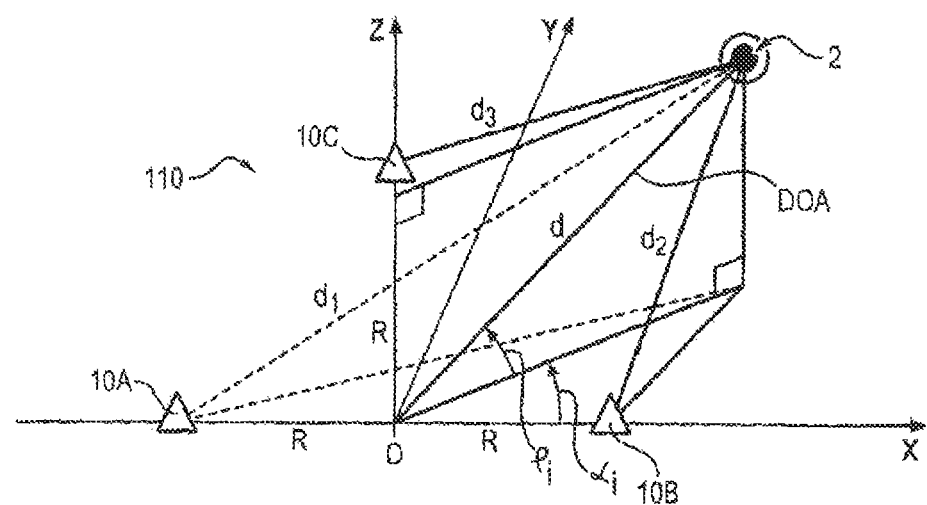
Figure 9:
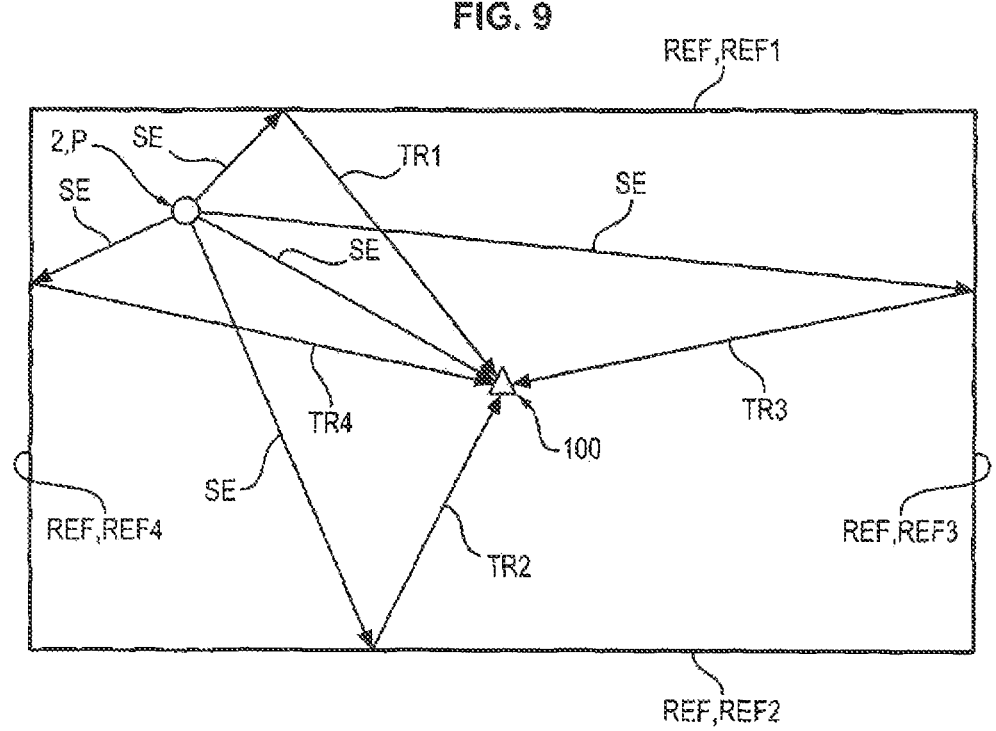
Figure 10:
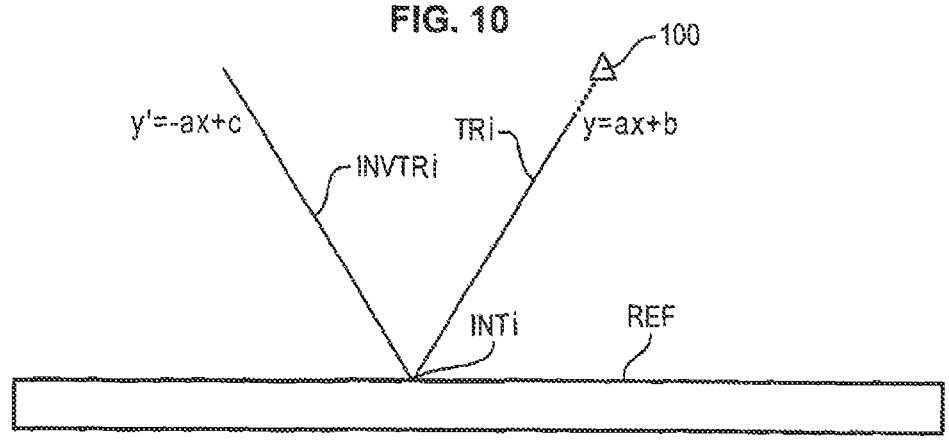

The invention will be more clearly understood from the following description, given solely by way of non-limiting example in reference to the appended drawings, in which:

FIG. 1 schematically illustrates an example of spatial referential taken relative to two antennas of the location device according to the invention in a two-dimensional plane, FIG. 2 schematically illustrates an embodiment of a receiver of the location device according to the invention, as well as a transmitter, FIG. 3 schematically illustrates a receiver of the location device in an embodiment according to the invention, FIG. 4A schematically illustrates an example of the impulse response of a channel of the receiver in the case of propagation unobstructed between the transmitter and the receiver of the location device according to the invention, FIG. 4B schematically illustrates an example of the impulse response of a channel of the receiver in the case of propagation in the presence of an obstacle between the transmitter and the receiver of the location device according to the invention, FIG. 4C is a schematic digital representation of an example of the impulse response of a channel of the receiver in ordinate, as a function of time in abscissa, in the case of propagation unobstructed between the transmitter and the receiver of the location device according to the invention, FIG. 5 schematically illustrates matrices used in the computing method carried out in the receiver of the location device according to the invention, FIG. 6 schematically illustrates a modular synoptic of a computing module of the receiver of the location device according to the invention, FIG. 7 schematically illustrates a system of spherical coordinates used in another embodiment of the location device according to the invention, FIG. 8 schematically illustrates another embodiment of the location device according to the invention enabling three-dimensional location, FIG. 9 schematically illustrates an example of use of the location device according to the invention in a room, FIG. 10 schematically illustrates an example for determining the emission direction of the signal emitted by the transmitter by the location device according to the invention.

In the FIGS. 1, 2 and 3, the location device 1 of a remote RFID transmitter 2 comprises at least one receiver 100 having at least one first antenna 10A for receiving the emitted signal SE and at least one second antenna 10B for receiving the emitted signal SE, the signal SE being emitted wirelessly by the RFID transmitter 2. The RFID transmitter 2 is for example of active type. The RFID transmitter 2 comprises one or more antennas 20 for emission of the signal SE to the receiver 100. The RFID transmitter 2 consists of or comprises for example at least one RFID tag. The RFID transmitter 2 is capable of sending the signal SE to a distance of several meters. The emitted signal SE is of the ultra-wide band type. The emitted signal SE is for example according to the standard IEEE802.15.4a. The transmitter 2 is for example a mobile transmitter. The transmitter 2 is for example fixed to an object or worn by une person. The signal SE is a radio signal. Of course, an object or a person can carry or wear several transmitters 2.

The receiver has for example a single first antenna 10A and a single second antenna 10B as in FIG. 1. In an embodiment, the emitted signal SE has at least one frequency included in the band going from 3 to 10.6 GHz.

In an embodiment, as shown on FIGS. 1, 2 and 3, the signal SE emitted by the transmitter 2 and received at each of the antennas 10A and 10B of the receiver 100 consists of a frame itself comprising a known preamble followed by some unknown data. The preamble itself comprises a synchronisation heading and a code uniquely identifying the end of this synchronisation heading. The synchronisation heading is formed by the periodic repetition of a deterministic sequence C of separate pulses separated by phases of silence. Note s(t) the signal of the synchronisation heading, formed by periodic repetition of a sequence $C=\{C_0; C_1; \ldots C_{L-1}\}$ of L elementary pulses p(t) transmitted with the period $T_S = S \cdot T_c$ seconds between the successive pulses p(t) of the sequence C, where L is a non-zero natural integer, mod L designates the operator modulo L (equal to the rest of the division by L), $T_c$ is the duration of each pulse p(t) and K is the number of repetitions of the sequence C.

$$s(t) = \sum_{k=0}^{K \cdot L} C_{k \bmod L} p(t - kT_s); (\forall k) C_k \in \{-1; 0; 1\}$$

In an embodiment of the invention, the sequence C is individual and different for each transmitter 2, and therefore for each object or person wearing this transmitter 2.

In another embodiment of the invention, as shown on FIGS. 1, 2 and 3, the sequence C is identical for each transmitter 2 or for a set of several transmitters 2, and therefore for several objects or persons each carrying a transmitter 2.

In an embodiment of the invention, as shown on FIGS. 1, 2 and 3, each pulse has for example a duration $T_c$ of 2 ns and a period of silence of 30 ns separates two successive pulses of the synchronisation heading, or S=16. The form of each pulse is such that for example the signal occupies a frequency bandwidth of 500 MHz centred around 8 GHz in the frequential field.

The receiver 100 comprises two antennas separated by a distance D smaller than the distance which separates the mobile transmitter from the receiving device.

The device is located in an environment bringing a plurality of separate propagation paths TRi of the signal SE emitted wirelessly by the transmitter 2. These paths are due to the fact that the emitted signal SE, in addition to the direct path of the transmitter 2 to each antenna 10A and 10B, undergoes one or more reflections in the environment, by a reflecting element or reflecting elements formed for example by surfaces, floor, ceilings, walls, obstacles or other walls and designated overall by the reference REF which can be for example in a building, such an environment being for example an internal environment. Consequently, the emitted signal SE has, in addition to the direct path TR0 from the transmitter 2 to each antenna 10A and 10B, one or more separate indirect paths TR1, . . . , TRN from the transmitter 2 to each antenna 10A and 10B. These paths TR0, TR1, . . . , TRN for propagation of the signal SE emitted wirelessly by the transmitter 2 are designated overall by paths TRi, for i variant from 0 to N, where N is a non-zero natural integer.

The first antenna 10A and the second antenna 10B are connected respectively to a first receiving path 11A supplying a first path signal yA as a function of the emitted signal SE and a second receiving path 11B supplying a second path signal yB as a function of the emitted signal SE.

The first antenna 10A and the second antenna 10B are at a distance from each other and respectively have first and second predetermined positions relative to each other.

In an embodiment, as shown on FIGS. 1, 2 and 3, the distance D which separates the two antennas 10A and 10B from the receiver 100 is equal to a wavelength of the central frequency of the emitted signal SE by the transmitter 2. This wavelength λ corresponds to the central emission frequency of the emitted signal SE having a pulsation $\omega = \omega_{TX}$.

The first antenna 10A defines a first receiving channel A for receiving the emitted signal SE according to the plurality of paths TRi. The second antenna 10B defines a second receiving channel B for receiving the emitted signal SE according to the plurality of paths TRi.

In an embodiment, as shown on FIGS. 1, 2 and 3, each path 11A, 11B implements conventional homodyne architecture.

In the following, the notation~designates complex numbers.

The device comprises a first converter 12A, 13A to convert the signal $s_A$ received by the first antenna 10A into the first path signal yA in base band sent to the first estimation module 14A and a second converter 12B, 13B to convert the signal $s_B$ received by the second antenna 10B in the second path signal yB in base band sent to the second estimation module 14B. The radio signal received by each of the antennas 10A and 10B is respectively processed in each receiving path 11A and 11B by a low-noise amplifier 12A and 12B (LNA), then is transposed to base band by means of a mixer 13A and 13B. The result of this operation is, for each path 11A and 11B, a complex signal in base band yA (also noted $\tilde{y}_A(t)$), respectively yB (also noted $\tilde{y}_B(t)$). The elements 12A, 13A, 12B, 13B are for example provided in the receiver 100.

In an embodiment, as shown on FIG. 3, the receiver 100 comprises a local oscillator 101 supplying a clock signal to the mixers 13A, 13B.

In an embodiment, as shown on FIG. 3, the receiver 100 comprises a single local oscillator 101 shared between these two receiving paths 11A and 11B.

The device further comprises a first estimation module 14A for estimation of the first impulse response HA of the plurality of paths TRi of the first channel A to the emitted signal SE as a function of the emitted signal SE and of the first path signal yA, a second estimation module 14B for estimation of the second impulse response HB of the plurality of paths TRi of the second channel B to the emitted signal SE as a function of the emitted signal SE and of the second path signal yB. The elements 14A, 14B are provided for example in the receiver 100.

As indicated by FIG. 2, the antennas 10A and 10B of the receiver in fact receive several echoes TRi from the radio signal SE, produced by the environment. Therefore the signal received $s_A = s_A(t)$ and $s_B = s_B(t)$ by each antenna 10A and 10B is expressed as:

$$\begin{cases} s_A(t) = \sum_{i=0}^{N} h_{A,i} \cdot s(t - \tau_{A,i}) \cdot \cos\omega_{TX}(t - \tau_{A,i}) \\ s_B(t) = \sum_{i=0}^{N} h_{B,i} \cdot s(t - \tau_{B,i}) \cdot \cos\omega_{TX}(t - \tau_{B,i}) \end{cases}$$

with $\tau_{A,i}$ and $\tau_{B,i}$ respectively the arrival time of the i-th path TRi of the emitted signal SE to the antenna 10A, respectively to the antenna 10B. The coefficients $h_{A,i}$ and $h_{B,i}$ express the attenuation affecting each of the paths TRi and are the coefficients of amplitude respectively of the impulse response HA of the plurality of paths TRi of the first channel A and the impulse response HB of the plurality of paths TRi of the second channel B, for i variant from 0 to N.

The first antenna 10A and the second antenna 10B are at a distance from each other and respectively have first and second predetermined positions relative to each other, such that the first receiving channel A is substantially identical to the second channel B receiving.

Because the antennas 10A and 10B are spaced apart slightly relative to the distance which separates the transmitter 2 or the reflecting elements REF from the receiver 100, the first propagation channel A from the transmitter 2 to the antenna 10A is supposed to be substantially identical to the second propagation channel B from the transmitter 2 to the antenna 10B. Only the arrival times $\tau_{A,i}$ and $\tau_{B,i}$ vary and this is noted:

$$\tau_{B,i} = \tau_{A,i} + (\Delta t)_i$$

where $(\Delta t)_i$ is a time dependent on the path TRi and expresses the difference in arrival time of the path TRi at the antenna 10B relative to the antenna 10A. The arrival time $\tau_{A,i}$ and $\tau_{B,i}$ correspond to the time of flight associated with the i-th path TRi.

Because the propagation channel A from the transmitter 2 to the antenna 10A is considered substantially identical to the propagation channel B from the transmitter 2 to the antenna 10B, each propagation path TRi of the emitted signal SE arrives with substantially the same angle of arrival ANGi at the first antenna 10A and at the second antenna 10B, as shown in FIG. 1, the angles of arrival ANGi, ($\alpha$i, $\phi$i) being different between the paths TRi, as is shown by way of example in FIG. 2 for the angle of arrival ANG0 of the path TR0 different to the angle ANGN of arrival of the path TRN. Consequently, ANGi{fourth root}ANGj for i≠j.

The angles of arrival ANGi of the paths TRi are taken relative to a fixed predetermined referential relative to the receiver 100 and relative to the antennas 10A and 10B of the receiver 100, and for example in a fixed plane containing a fixed direction x relative to the antennas 10A and 10B, this direction x being for example able to pass through the antennas 10A and 10B in FIG. 1.

This gives:

$$t_{A,i} = t - \tau_{A,i}$$

and $$t_{B,i} = t - \tau_{B,j}$$

$$\begin{cases} \tilde{y}_A(t) = \sum_{i=0}^{N} h_{A,i} \cdot s(t_{A,i}) \cdot e^{j\theta_{A,i}}, e^{j\Delta\omega t + j\varphi} \\ \tilde{y}_B(t) = \sum_{i=0}^{N} h_{B,i} \cdot s(t_{B,i}) \cdot e^{j\theta_{B,i}}, e^{j\Delta\omega t + j\varphi} \end{cases}$$

In the equations hereinabove, $\Delta\omega$ corresponds to misalignment between the emission frequency $\omega_{TX}$ of the oscillator of the transmitter 2 and the receiving frequency $\omega_{RX}$ of the oscillator 101 of the receiver 100. In these equations, ($\varphi$ corresponds to phase misalignment between the oscillator of the transmitter 2 and the oscillator 101 of the receiver 100.

$$\omega_{RX} = \omega_{TX} + \Delta\omega$$

The appearance of two phase terms $\theta_{A,i}$ and $\theta_{B,i}$ given by the following are noted:

$$\theta_{A,i} = \omega_{TX} \cdot t_{A,i}$$

and $$\theta_{B,i} = \omega_{TX} \cdot t_{B,i}$$

The phase difference $\theta_{A,i} - \theta_{B,i}$ observed on receipt of a path TRi at the antennas 10A and 10B is directly linked to the difference in arrival time $t_{A,i} - t_{B,i}$ at the antennas 10A and 10B, which is equal to $$\theta_{A,i} - \theta_{B,i} = \omega_{TX} \cdot (t_{A,i} - t_{B,i})$$

The form of the pulse p(t) is supposed to be such that for antennas having small distance between each other, and therefore for small times $(\Delta t)_i$, $t_i = t - \tau_i$ can be put near $t_{A,i}$ and $t_{B,i}$ such that:

$$s(t_{A,i}) \approx s(t_{B,i}) \approx s(t - \tau_i)$$

In an embodiment, as shown on FIGS. 2 and 3, the complex signals $\tilde{y}_A(t)$ and $\tilde{y}_B(t)$ present at the outlet of each mixer 13A and 13B have a bandwidth of 250 MHz and the spacing D=3.75 cm is equal to a wavelength of the central frequency of the signal SE emitted around 8 GHz. The temporal offset between the pulses viewed by the paths 11A and 11B is therefore less than 125 ps.

Hereinbelow, the notation ^ expresses the uncertainty introduced on different terms. In fact, the receiver 100 will have to constitute an estimation of the different contributors from signals $\tilde{y}_A(t)$ and $\tilde{y}_B(t)$ present at the outlet of each mixer 13A and 13B.

In an embodiment, as shown on FIG. 3, the first impulse response HA is estimated by the module 14A in the digital field and accordingly comprises a multiplicity of first components hnA resulting from discrete-time sampling of period T. The first estimation module 14A calculates the first impulse response HA in the form of a first multiplicity of samples hnA in discrete time.

In this same embodiment, the second impulse response HB is estimated by the module 14B in the digital field and accordingly comprises a multiplicity of second components hnB resulting from discrete-time sampling of period T. The second estimation module 14B calculates the second impulse response HB in the form of a second multiplicity of samples hnB in discrete time.

The paths TRi are represented in this digital signal HA, HB.

In an embodiment, as shown on FIGS. 2 and 3, the device comprises at least one analog-to-digital converter $15A_{RE}$, $15A_{IM}$, $15B_{RE}$, $15B_{IM}$ for converting the first path signal yA in base band into the first path signal yA# in digital base band sent to the first estimation module 14A and for converting the second path signal yB in base band respectively into the second path signal yB# in digital base band sent to the second estimation module 14B. Each of the two components (phase component and quadrature component) of the signals in base band $\tilde{y}_A(t)$ and $\tilde{y}_B(t)$ is converted from analog to digital by means of analog-to-digital converters (ADC) $15A_{RE}$, $15A_{IM}$, $15B_{RE}$, $15B_{IM}$. The elements $15A_{RE}$, $15A_{IM}$, $15B_{RE}$, $15B_{IM}$ are for example provided in the receiver 100.

The phase component $Re(\tilde{y}_A(t))$ of the signal in base band $\tilde{y}_A(t)$ of the first path 11A is converted by a first analog-todigital converter $15A_{RE}$ into a set of digital samples $Re(\tilde{y}_{A,n})$ sent to a first input 14A1 of the first estimation module 14A.

The quadrature component $Im(\tilde{y}_A(t))$ of the signal in base band $\tilde{y}_A(t)$ of the first path 11A is converted by a second analog-to-digital converter $15A_{IM}$ into a set of digital samples $Im(\tilde{y}_{A,n})$ sent to a second input 14A2 of the first estimation module 14A.

The signal yA# is the set of samples $y_{A,n}$.

The phase component $Re(\tilde{y}_B(t))$ of the signal in base band $\tilde{y}_B(t)$ of the second path 11B is converted by a third analog-to-digital converter $15B_{RE}$ into a set of digital samples $Re(\tilde{y}_{B,n})$ sent to a first input 14B1 of the second estimation module 14B.

The quadrature component $Im(\tilde{y}_B(t))$ of the signal in base band $\tilde{y}_B(t)$ of the second path 11B is converted by a fourth analog-to-digital converter $15B_{IM}$ into a set of digital samples $Im(\tilde{y}_{B,n})$ sent to a second input 14B2 of the second estimation module 14B.

The signal yB# is the set of samples $y_{B,n}$.

The four converters $15A_{RE}$, $15A_{IM}$, $15B_{RE}$, $15B_{IM}$ can for example work synchronously and function at a frequency derived from the oscillator 101 shared by way of a frequency divider 102 and a delay line 103.

In an embodiment, as shown on FIG. 3, the frequency divider 102 operates for example with a division ratio of 16 from the oscillator 101 operating at 8 GHz, i.e. at an operating frequency of the converters $15A_{RE}$, $15A_{IM}$, $15B_{RE}$, $15B_{IM}$ of 500 MHz.

Hereinbelow, $y_{A,n} = \tilde{y}_{A,n}$ designates the complex digital signal of the first path 11A in base band, whereof the real part is the digital signal $Re(\tilde{y}_{A,n})$ of the first input 14A1 of the first module 14A and whereof the imaginary part is the digital signal $Im(\tilde{y}_{A,n})$ of the second input 14A2 of the first module 14A.

The signal $y_{B,n} = \tilde{y}_{B,n}$ designates the complex digital signal of the second path 11B in base band, whereof the real part is the digital signal $Re(\tilde{y}_{B,n})$ of the first input 14B1 of the second module 14B and whereof the imaginary part is the digital signal $Im(\tilde{y}_{B,n})$ sent to a second input 14B2 of the second module 14B.

The estimation problem is formulated in the form:

$$\begin{cases} \tilde{y}_{A,n} = \tilde{y}_A(nT) = \sum_{i=0}^{N} \hat{h}_{A,i} \cdot \hat{s}(nT - \hat{\tau}_i) \cdot e^{j\hat{\theta}_{A,i}}, e^{j\Delta\tilde{\omega}nT + j\varphi} \\ \tilde{y}_{B,n} = \tilde{y}_B(nT) = \sum_{i=0}^{N} \hat{h}_{B,i} \cdot \hat{s}(nT - \hat{\tau}_i) \cdot e^{j\hat{\theta}_{B,i}}, e^{j\Delta\tilde{\omega}nT + j\varphi} \end{cases}$$

A succession of M samples of $y_{A,n}$ and $y_{B,n}$ is observed such that
$M \cdot T \geq \tau_N$ supposing the $\tau_i$ greater than or equal to zero and increasing from $\tau_0$ to $\tau_N$ or also
$M \cdot T \geq \max(\tau_i)$.

It is also supposed that the sampling period T is such that the Shannon condition is satisfied, ending in discretization without loss of signal in continuous time $\tilde{y}_A(t)$, respectively $\tilde{y}_B(t)$, in the discrete-time signal $y_{A,n}$ and respectively $y_{B,n}$.

It is also supposed that the environment is such that the propagation paths TRi and TRj, for i different to j, are separated by at least one period T such that these paths TRi and TRj can be discriminated in the discrete field, as is shown by way of illustrative example in FIG. 4C representing the paths as a function of the discrete sampling index n in abscissa.

Whatever i different to j, for the paths TRi and TRj, respectively having the different arrival time $\tau_i$ and $\tau_j$, there is therefore $$|\tau_j - \tau_i| > T$$

It is noted that the imperfections linked to analog/digital conversion contribute to an error on amplitude estimation of $\widehat{h_i}$ and $\hat{s}(nT)$, and phase of $\widehat{\theta_{i,j}}$.

In an embodiment capable of functioning by coherent integration, as shown on FIG. 3, the receiver is synchronised so as to compensate offset in frequency and phase with the transmitter. These subjects are covered substantially in the prior art and those skilled in the art will have no problem in implementing these techniques. Synchronisation can be created for example by means of an oscillator controlled digitally (DCO) 101 and a delay line 103 on digital control, both controlled from the digital field by a synchronisation module 19. The synchronisation module 19 ensures time and frequency synchronisation of the oscillator 101 of the converters 12A, 13A, 12B, 13B in base band and of the analog-to-digital converters $15A_{RE}$, $15A_{IM}$, $15B_{RE}$, $15B_{IM}$. The elements 101, 102, 103 and 19 are provided for example in the receiver 100.

Once frequency and time synchronisation is obtained, the receiver is able to perform coherent integrations of several individual pulses and improve the signal-to-noise ration on receipt. The terms $\Delta\omega$ and $\phi$ are therefore considered deleted hereinbelow.

The following step consists of calculating estimation of the impulse response $HA = \widetilde{H_{A,n}}$ of the first propagation channel A and estimation of the impulse response $HB = \widetilde{H_{B,n}}$ of the second propagation channel B. This estimation is carried out for each of the two paths 11A and 11B respectively from the first and second signal paths in digital base bands yA# and yB#, therefore in complex space.

There is:

$$\widetilde{H_{A,n}} = \sum_{i=0}^{N} \widehat{h_{A,i}} \cdot e^{j\widehat{\theta_{A,i}}} \cdot \delta(nT - \widehat{\tau_{A,i}})$$

$$\widetilde{H_{B,n}} = \sum_{i=0}^{N} \widehat{h_{B,i}} \cdot e^{j\widehat{\theta_{B,i}}} \cdot \delta(nT - \widehat{\tau_{B,i}})$$

As a function of time in abscissa, FIG. 4A presents an illustration of the module of the impulse response HA or HB in the case of propagation in the presence of one or more reflecting elements REF and in the case of propagation unobstructed between the transmitter 2 and the receiver 100, as shown on FIGS. 2 and 3. As a function of time in abscissa, FIG. 4B presents an illustration of the modulus of the impulse response HA or HB in the case of propagation in the presence of one or more reflecting elements REF and in the case of propagation obstructed between the transmitter 2 and the receiver 100, as shown on FIG. 2. FIGS. 4A and 4B show that in addition to the direct path TR0, more attenuated in the case of FIG. 4B than FIG. 4A, other propagation paths TR1, . . . , TRN arriving later than the path TR0 exist, for example due to reflections on the walls, the floor or the ceiling, as shown on FIGS. 2 and 9.

FIG. 4C shows that the sampling instants n of HA are finer (each n is distant from its neighbour by a sampling period T) than the time spreads between the arrival time $\tau_0$, $\tau_1$, $\tau_2$ of the respective paths TR0, TR1, TR2, with the modulus of HA in ordinates, as shown on FIGS. 2 and 9. The same applies for HB. In this way, the impulse responses HA and HB includes the samples hiA, hiB corresponding to the paths TRi.

The phase information specified by each of the complex samples of the paths A and B is also accumulated during the method of coherent integration which enables construction of the representation of the impulse response HA, HB of the channel A, B, as shown on FIG. 3.

In an embodiment, as shown on FIGS. 2, 3 and 5, the estimation module 14A calculates the samples $hnA = \widetilde{\widetilde{H_{A,n}}}$ of the first estimation of impulse response HA of the first channel A by making a correlation between the first digital path signal $yA\# = \tilde{y}_{A,n}$ and a signal CCAL calculated by circular permutations of the sequence C. The estimation module 14B calculates the samples $hnB = \widetilde{\widetilde{H_{B,n}}}$ of the second estimation of impulse response HB of the second channel B by making a correlation between the second digital path signal $yB\# = \tilde{y}_{B,n}$ and the signal CCAL calculated by circular permutations of the sequence C. The sequence C is contained in the emitted signal SE (for example sequence C being the sequence C of pulses present in the synchronisation heading of the preamble of the emitted signal SE). For example, this sequence C is pre-registered in the receiver. For this to happen, this sequence C is stored in advance or programmed in advance in the receiver 100. For example, said sequence C contained in the emitted signal SE is pre-registered in the first estimation module 14A and in the second estimation module 14B or in another memory of the receiver 100. These calculations are made for example by coherent integration by accumulating the results of correlations between the samples of a reception flow and circular permutations of the sequence used to construct the synchronisation heading. The result is a vector whereof the dimension is the number of samples of the sequence of preamble, and whereof each component bears a complex result of accumulation. Accumulation can last over several repetitions K of the preamble sequence.

$$\widetilde{\widetilde{H_{A,n}}} = \sum_{k=0}^{K-1} \sum_{m=0}^{L-1} \tilde{y}_{A,(n \bmod S)+m.s+k.L.S} \cdot C_{(L+m-\lceil \frac{n}{S} \rceil) \bmod L}$$

$$\widetilde{\widetilde{H_{B,n}}} = \sum_{k=0}^{K-1} \sum_{m=0}^{L-1} \tilde{y}_{B,(n \bmod S)+m.s+k.L.S} \cdot C_{(L+m-\lceil \frac{n}{S} \rceil) \bmod L}$$

In these equations, $$\lceil \frac{n}{S} \rceil$$

designates the integer pan or nib, rounded up to the upper integer. K, L, S are prescribed and/or preregistered natural integers in the modules 14A and 14B. This operation can be performed by means of a matricial product.

$[\widehat{H}_A] = [\tilde{Y}_A] \cdot [CCAL]$ $[\widehat{H}_B] = [\tilde{Y}_B] \cdot [CCAL]$ $[\widehat{H}_A]$ is a complex matrix of dimension S×L whereof the columns are formed from the samples $\widetilde{\widetilde{H_{A,n}}}$,
$[\tilde{Y}_A]$ is a complex matrix of dimension S×L whereof the columns are formed by the samples $\tilde{y}_{A,n}$,

[CCAL] is a real matrix of dimension L×L whereof the columns are formed by the circular permutations of the sequence C, $[\widehat{H}_B]$ is a complex matrix of dimension S×L whereof the columns are formed by the samples $\widetilde{\widetilde{H_{B,n}}}$, $[\tilde{Y}_B]$ is a complex matrix of dimension S×L whereof the columns are formed by the samples $\tilde{y}_{B,n}$.

FIG. 5 illustrates this calculation method in the case of an example, where K=1, L=16 and S=31. In this example, each impulse response has 496 components.

In a practical implementation, it is necessary to conserve L×S intermediate results only and to process the operations of matricial multiplication as the samples $\tilde{y}_{A,n}$ and $\tilde{y}_{B,n}$ arrive.

FIG. 6 presents an embodiment of a part 140 present in the estimation modules 14A and 14B of FIG. 3 for performing this operation. This part 140 is described for the module 14A and can of course be the same in the module 14B, by replacing the variables of the first path 11A by the variables of the second path 11B.

This part 140 comprises a storage zone 141 which is initialised at 0. An index counter 142 is incremented on arrival of each of the samples of signal $\tilde{y}_{A,n}$ from 1 until the final value K×L×S is reached. A logic block 143 supplies the values of the signal CCAL (calculated by circular permutations of the sequence C, that is, all the coefficients $C_i$ of the signal CCAL), for updating the values $\widetilde{\widetilde{H_{A,n}}}$ affected by the datum $\tilde{y}_{A,n}$ applied to a first input 144 of multipliers 146, whereof the second input 145 receives values from the signal CCAL. A single datum $\tilde{y}_{A,n}$ can cause updating of L values $\widetilde{\widetilde{H_{A,n}}}$. The intermediate products $C_i \cdot \tilde{y}_{A,n}$ obtained at the outlet of the multipliers 146 are accumulated on the values $\widetilde{\widetilde{H_{A,n}}}$ kept by the storage zone 141. The intermediate products $C_i \cdot \tilde{y}_{A,n}$ obtained at the outlet of the multipliers 146 (product of the first input 144 by the second input 145) are sent to the first input 148 of adders 147, whereof the second input 149 receives the values $\widetilde{\widetilde{H_{A,n}}}$ kept by the storage zone 141. The output 150 of the adders 147, equal to the addition of inputs 148 and 149, is sent back to the storage zone 141 to update the values $\widetilde{\widetilde{H_{A,n}}}$ via this outlet 150. After the arrival of $\tilde{y}_{A,L \cdot S}$, that is, in the example hereinabove of $\tilde{y}_{A,496}$, the method can continue by replacing $\tilde{y}_{A,n+L \cdot S}$ ($\tilde{y}_{A,n+496}$ in the example hereinabove) by $\tilde{y}_{A,n}$ in the explanation hereinabove. On completion of the accumulation of K×L×S samples, an estimation of the impulse response HA, HB of the channel A, B is found in the storage zone 141.

The impulse response HA, HB of the channel A, B can also be estimated by other means.

The device comprises an extraction module 161 for extracting from the first impulse response HA, hnA a plurality of first components hiA associated respectively with the plurality of paths TRi arriving at the first antenna 10A, and for extracting from the second impulse response HB, hnB a plurality of second components hiB associated respectively with the plurality of paths TRi arriving at the second antenna 10B. The module 161 comprises a first input 16A for receiving of the estimation of the first impulse response HA calculated by the module 14A and a second input 16B for receiving of the estimation of the first impulse response HB calculated by the module 14B. The module 161 is provided for example in the receiver 100.

In an embodiment, as shown on FIGS. 2 and 3, the extraction module 161 extracts from the multiplicity of first components or samples hnA the plurality of first components hnA which corresponds to the plurality of paths TRi and which are therefore called hiA. The extraction module 161 extracts from the multiplicity of second components or samples hnB the plurality of the second components hnB which corresponds to the plurality of paths TRi and which are therefore called hiB.

For example, for this to happen, the module 161 eliminates the components hnA zero or substantially zero. For example, for this to happen, the module 161 selects among the first components hnA the first components hiA whereof the modulus exceeds a certain predetermined threshold. This threshold is fixed in advance, is positive or zero and is for example a noise threshold, for eliminating the components hnA which are too weak, which do not correspond to a path TRi but correspond to noise. In fact, the example illustrating FIG. 4C shows that the first impulse response HA has first components hnA of non-zero module for h3A, h11A and h17A (or for n=3, 11, 17) associated with the paths TR0, TR1, TR2, while the first components hnA for h0A, h1A, h5A, h10A, h12A, h15A, h18A (or for n=0, 1, 5, 10, 12, 15, 18) are of zero module; in this example, the module 161 eliminates h0A, h1A, h5A, h10A, h12A, h15A, h18A and selects h3A, h11A and h17A as being associated with the paths TR0, TR1, TR2. In the illustrative example of FIG. 4C, the first impulse response HA has first components hnA, whos modulus is non-zero for h3A, h11A and h17A (i.e. for n=3, 11, 17) associated with paths TR0, TR1 and TR2, whereas the first components hnA for h0A, h1A, h5A, h10A, h12A, h15A, h18A (i.e. for n=0, 1, 5, 10, 12, 15, 18) have a modulus equal to zero; in this example, the module 161 eliminates h0A, h1A, h5A, h10A, h12A, h15A, h18A and selects h3A, h11A and h17A as being associated with paths TR0, TR1, TR2.

For example, in the same way, the module 161 eliminates the zero or substantially zero components hnB. For example, for this to happen, the module 161 selects from among the second components hnB the second components hiB whereof the modulus exceeds a certain predetermined threshold. This threshold is fixed in advance, is positive or zero and is for example a noise threshold, to eliminate the components hnB which are too weak, which do not correspond to a path TRi but correspond to noise.

The threshold can also be applied to a linear combination of the modulus of the first components hnA and hnB, to extract the components hiA and hiB exceeding this threshold according to the method indicated hereinabove.

The device further comprises a module 162 for calculation of a plurality of argument differences $\theta i = \arg(hiA) - \arg(hiB)$ between the argument $\arg(hiA)$ of each first component hiA extracted by the module 161 from the estimation of the first impulse response HA and the argument $\arg(hiB)$ of each second component hiB extracted by the module 161 of the estimation of the second impulse response HB, these argument differences $\theta i$ being associated respectively with the plurality of paths TRi for i going from 0 to N.

$\theta i$ is an estimation of the phase difference observed between the antennas 10A and 10B on receipt of the train of pulses corresponding to a delayed echo of nT second.

$\arg(hnA) = \arg \widehat{H}_{A,n}$ $\arg(hnB) = \arg \widehat{H}_{B,n}$ $\theta i = \arg(hiA) - \arg(hiB)$ The device further comprises a conversion module 17 to convert the plurality of argument differences $\theta i = \arg(hiA) - \arg(hiB)$ into a plurality of components of angles of arrival ANGi, for identifying the angle of incidence of the plurality of paths TRi relative to the receiver 100. The module 17 is for example provided in the receiver 100.

The angles of arrival ANGi are for example in a predetermined two-dimensional plane fixed arbitrarily relative to the receiver. The transmitter 2 is supposed to belong to this same plane.

In an embodiment, from the plurality of argument differences $\theta i$, and therefore for each given path TRi in the propagation channel, is obtained an estimation of the angle of arrival ANGi via the following relation:

$ANGi = \cos^{-1}((c \cdot \theta i)/(\omega \cdot D))$ with $\omega = \omega_{RX} = \omega_{TX}$ = pulsation at the emission frequency of the emitted signal SE from the transmitter 2, D = separation distance between the first antenna 10A and the second antenna 10B, c = speed of light, $\cos^{-1}$ is the arccos function.

The angle of arrival ANGi is an angle in a two-dimensional plane, for example as per FIG. 1.

The result therefore is respectively the angles of arrival ANG0, ANG1, ..., ANGN respectively for the paths TR0, TR1, ..., TRN relative to the receiver.

In an embodiment, as shown on FIGS. 2 and 3, this function for calculation of ANGi depending on $\theta i$ is implemented in the form of a phase/angle conversion method which can be implemented by means of an algorithm CORDIC. This processing of the module 17 can be integrated into the receiver or deported to an external processing unit which combines the differences $\theta i$ of one or more receivers 100, for example with the aim of refining the angle estimation.

A module 18 is provided for determining a probable location P of the RFID transmitter 2 from the plurality of angles of arrival ANGi (that is, the angles of arrival ANG0, ANG1, ..., ANGN) respectively of the plurality of paths TRi (that is, paths TR0, TR1, ..., TRN). The location is created at least in a predetermined two-dimensional plane or can be done three-dimensionally.

For example, this module 18 performs triangulation by using the angles ANGi, that is, ANG0, ANG1, ..., ANGN respectively for the paths TRi, that is, TR0, TR1, ..., TRN relative to the receiver 100, to obtain as a function of the coordinates of the elements REF of the environment involving these paths and by triangulation the coordinates of a point P where the transmitter 2 is probably located. This produces the position of the transmitter 2. For example, for this to happen, the coordinates of the reflecting elements REF of the environment involving these paths, as well as the position and orientation of antennas 10A and 10B of the receiver 100 are pre-registered in the module 18 for calculating the coordinates of a point P where the transmitter 2 is probably located. The module 18 is provided for example in the receiver 100.

Due to the very short duration of the UWB pulses, it is possible for a receiver to treat each pulse in an isolated manner, and therefore discern the different propagation paths in the environment. This enables to identify for example the shortest path, giving the best results in estimating the relative distance, or to combine analysis of multiple reflections on the elements REF of the environment (walls, ceiling, floor), to obtain more complete information on the environment.

Hereinbelow is an example of estimation of a position P by the module 18 from multiple angles of incidence measured by a receiver or receivers. Of course, other algorithms are feasible.

Case of a Single Receiver:

The case is presented here of the resolution of location in a plane from a receiving device 100 capable of supplying an estimation of angles of incidence ANGi associated with the paths TRi for i=0, . . . , N. The receiver 100 is positioned so that the antennas 10A and 10B belong to a horizontal plane.

In the example of FIG. 9, the environment comprises, first, second, third and fourth walls REF1, REF2, REF3, REF4 extending in four different planes as reflecting elements REF, for example forming a rectangle viewed from above. If the focus is solely on the primary reflections of the emitted signal SE on the four walls REF1, REF2, REF3, REF4, five paths TR0 (direct path), TR1 (reflection on the wall REF1), TR2 (reflection on the wall REF2), TR3 (reflection on the wall REF3) and TR4 (reflection on the wall REF4) are observed at the receiver 100. This can be generalised to successive reflections on several walls. The receiver therefore determines 5 angles of incidence identifying the direction of arrival of each of the 5 paths. More complex cases of non-rectangular rooms and to buildings comprising several not necessarily rectangular rooms can evidently be generalised.

By way of back trace, from the receiver 100, straight lines are used—or cones if there is an estimation of the error estimation of angles ANGi, αi, ϕi. As the position of the walls REF1, REF2, REF3, REF4 fixed and known by the receiver 100 is supposed, for example in the form of input in digital format of the plan of the building, the phenomenon of reflection is reconstituted in the following way, as shown in FIG. 10.

In FIG. 10, for each indirect path TRi received by the receiver represented by 100, the second inverse straight line INVTRi obtained by inverse reflection towards the wall REF crossing this first straight line TRi at the point of intersection INTi located on the wall REF is calculated. So, for a first straight line TRi of equation y=a·x+b, this second straight line INVTRi has the equation y=−a·x+c by taking an axis x parallel to the wall REF and an axis y perpendicular to the wall REF.

In an embodiment, a probable position P is calculated as being at the point of intersection of the second straight lines INVTRi and of the direct path TR0, or at the intersection of one or more second straight lines INVTRi and of the direct path TR0, or at the intersection of several or all the second straight lines INVTRi.

This intersection calculation can also be specified or corroborated by the following.

In addition to the estimation of angles ANGi or (αi, ϕi) an estimation is known at +T/2 of the instant of arrival $\tau_i - \tau_0$ to (for i>0) of the indirect paths TR1, TR2, TR3, TR4 relative to the direct path TR0. There is therefore an estimation of the difference in distance traveled by the radio signal according to the different propagation paths identified.

A maximum theoretical weakening, which makes a signal undetectable by the receiver (signal received at the antenna having a power under the threshold of sensitivity of the receiver) can also be estimated. This latter parameter therefore gives a limit greater than the distance a radio signal was able to travel to be detected by the receiver. This distance can be called $d_{max}$.

A trace in the reverse direction INVTRi from the known position of the receiver 100 is therefore made as per the method explained hereinabove.

During intersection of a semi-straight line INVTRi with a wall, the focus is solely on the segment TRi between the receiver 100 and the point of intersection INTi with the wall REF, then on the segment formed by the semi-straight line INVTRi embodying the probable direction of arrival of the source of the reflection such as explained previously.

In another embodiment, the focus could be on successive reflections of the signal on several walls, in which case the method is repeated at each new intersection with a wall. This method is interrupted when the sum of the lengths of the resulting segments is greater than or equal to the limit $d_{max}$.

In this representation, a path TRi is represented as the succession of segments of a straight line followed during the preceding step of back trace. A possible position Pi(d) of the transmitter 2 can be attributed for a distance d traveled by the radio waves along each path TRi.

An estimation $\hat{d}_t$ of the difference in additional distance traveled along the indirect paths TRi (i>0) relative to the direct path TR0 is known. The most probable distance $\hat{d}$ traveled (connected to time of propagation t by the relation d=c·t) which minimises the relation is determined:

$$\hat{d} = \operatorname*{argmin}_{i \neq j} \sum dist(P_i(d + \hat{d}_i); P_j(d + \hat{d}_j))$$

The estimated position $\hat{P}$ of the RFID transmitter 2 can be determined as being for example the barycentre of the positions $P_i(d+\hat{d}_t)$.

The quality of the estimator of $\hat{d}$ can be enriched by the knowledge of the attenuation $a_i$ undergone as per the different propagation paths TRi, for example by performing weighting proportional to $a_i$ at the position $P_i(d+\hat{d}_t)$.

Case of Several Receivers:

The above can be generalised to joint measuring of U×N angles of incidence $ANG_0^u$ to $ANG_{N-1}^u$ corresponding respectively to N paths $TR_0^u$ to $TR_{N-1}^u$ seen by U receivers 100 (u∈{0; 1; . . . ; U−1} with U a natural integer greater than 1).

The back trace method such as defined previously is carried out for each of the U receivers 100. Generalisation of the above produces a set of U×N equations for associating a possible position $P_i^u(d+\hat{d}_t^u)$ with a common propagation time t=d/c.

In a first generalisation, which supposes that the U receivers 100 do not exchange information on arrival time $\tau_0^u$ of the path $TR_0^u$, the criterion can be minimised:

$$\hat{d} = \operatorname*{argmin} \sum_{u=0}^{U-1} \sum_{i \neq j} dist(P_i^u(d + \hat{d}_i^u); P_j^u(d + \hat{d}_j^u))$$

The position of the transmitter 2 is determined from $\hat{d}$, for example as being the barycentre of $P_i^u(\hat{d}+\hat{d}_t^u)$ or a subset of these points.

As shown on FIG. 3, the knowledge in the location method of the instants of arrival $\tau_0^u$ at each of the U receivers 100, or of the difference in arrival time between each pair of receivers, enables to carry out a second generalisation:

$$\hat{d} = \underset{\substack{(u,i) \neq (v,j) \\ u,v \in \{0;\ldots;U-1\} \\ i,j \in \{0;\ldots;N-1\}}}{\mathrm{argmin}} \sum dist\bigl(P_i^u(d+\hat{d}_i^u); P_j^v(d+\hat{d}_j^v)\bigr)$$

Here too, an estimation can be proposed of the probable position of the transmitter 2 as being the barycentre of $P_i^u(d+\hat{d}_i^u)$ or a subset of all these points, or by any other method.

The module 18 is for example provided in the receiver 100. In an embodiment, the receiver 100 comprises all the elements represented in FIG. 3.

In another embodiment, as shown on FIG. 8, the module 18 is located outside the receiver 100 and can be shared between several receivers 100.

In an embodiment, as shown on FIGS. 2, 3 and 8, the antennas 10A and 10B have first and second positions, which are predetermined and known relative to the receiver 100 and relative to a casing 111 associated with the receiver 100. The orientations of the antennas 10A and 10B are also predetermined and known relative to the receiver 100 and relative to the casing 111 associated with the receiver 100.

In an embodiment, as shown on FIGS. 2, 3 and 8, the entire receiver 100 will be integrated in the form of a circuit integrated on the same silicon chip.

In an embodiment, as shown on FIG. 3, the physical arrangement of the channels 11A and 11B is done symmetrically relative to the oscillator 101 placed on the axis of symmetry. This structure minimises the differences in terms of clock distribution time destined for the two mixers 13A and 13B and therefore limits a source of systematic error in estimation of the difference $\theta i$.

In an embodiment, as shown on FIG. 3, the physical arrangement of the analog-to-digital converters $15A_{RE}$, $15A_{IM}$, $15B_{RE}$, $15B_{IM}$ is done symmetrically relative to the oscillator 101 placed on the axis of symmetry. This structure minimises the disparity in the phase error introduced to the numbering of samples of channel 11A relative to those of channel 11B.

In an embodiment, as for example in FIGS. 1 and 2, a single receiver 100 (or a single device, comprising the elements indicated hereinabove) 1 is provided in a single base station 110 for determining the location of the transmitter 2.

In another embodiment, as shown on FIG. 8, several receivers 100 (or several devices 1 comprising the elements indicated hereinabove or several base stations 110) are provided for determining the location of the transmitter 2. In this case, the module 18 receives the estimations of angles of arrival ANGi calculated by the different modules 17 of the devices 1 or receivers 100 or base stations 110 for determining the location P of the transmitter 2 as a function of these estimations of angles of arrival ANGi. The receivers 100 or devices 1 or base stations 110 or antennas 10A and 10B of the latter are for example arranged at different predetermined positions of the inner environment (for example on a floor or floors, and/or under a ceiling or ceilings, and/or on a wall or wall(s), and/or on an obstacle or obstacles, and/or on a wall or walls, and this for example in a building, an apartment block or other).

In another embodiment, as shown on FIGS. 2 and 8, at least one base station 110 having one or more receivers 100 is provided.

In general, as shown on FIG. 2, the base station 110 is defined by the casing 111 to be fixed at a determined point of the inner environment, for example on a floor or floors, and/or under a ceiling or ceilings, and/or on a wall or wall(s), and/or on an obstacle or obstacles, and/or on a wall or walls, and this for example in a building, an apartment block or other. The casing 111 contains the receiver or the receiver(s) 100 of the base station 110. The antennas 10A and 10B of the receiver or receivers 100 of the base station 110 protrude for example from the casing 111 to receive signals from the environment.

In another embodiment shown in FIGS. 7 and 8, the base station 110 comprises, in addition to the first and second antennas 10A and 10B, at least one third antenna 10C located in a third predetermined position, as well as three receivers 100 such as described hereinabove, designated respectively by M1, M2, M3. The first position of the first antenna 10A, the second position of the second antenna 10B and the third position of the third antenna 10C are non-aligned. The first position of the first antenna 10A, the second position of the second antenna 10B and the third position of the third antenna 10C therefore form a triangle. The first receiver M1 is connected to the first antenna 10A and to the second antenna 10B. The second receiver M2 is connected to the first antenna 10A and to the third antenna 10C.

The module 17 is replaced by a conversion module 30 which calculates two separate angles of arrival in a three-dimensional referential, for example in spherical coordinates ($\alpha i$, $\phi i$), of the emitted signal SE by the transmitter 2 relative to the antennas 10A, 10B, 10C as a function of the first position of the first antenna 10A, of the second position of the second antenna 10B and of the third position of the third antenna 10C. The first position of the first antenna 10A, the second position of the second antenna 10B and the third position of the third antenna 10C are for example pre-registered in the conversion module 30. In the embodiment shown in FIG. 8, the third receiver M3 connected to the second antenna 10B and to the third antenna 10C is also provided. Two non-coplanar angles of spherical coordinates are determined which indicate the direction of arrival of each path TRi in space, for example the angle $\alpha i$ of azimuth and the angle $\phi i$ of elevation of the transmitter in a fixed referential relative to the antennas 10A, 10B, 10C.

FIG. 7 illustrates the referential of spherical coordinates in a referential in 3 orthonormal dimensions x, y, z crossing at the of origin point O, the angle $\alpha$ being the projection of the position of the transmitter 2 in the plane of the directions x and y, and $\phi$ being the angle of elevation of the position of the transmitter 2 relative to the plane of the directions x and y. The antennas 10A, 10B, 10C are for example located in the plane of the directions x and z.

The transmitter 2 sends out the signal SE which is sensed by the three antennas 10A, 10B and 10C the position of which is known, and which are respectively placed at a distance d from the transmitter 2, such that the distance d1, d2 and d3 respectively from the transmitter 2 to each of the antennas 10A, 10B and 10C is approximately equal to d, which is very high relative to the distance between the antennas 10A, 10B, 10C (at least 10 times greater). The point O, which serves as reference to the system, is at a distance d from the transmitter 2.

The system of polar coordinates ($\alpha$, $\phi$) is defined from the reference point O.

In the example shown in FIG. 7, the system is for example constructed such that: the antennas 10A, 10B and 10C are in a same plane and O is located in this plane; O is at a distance R from each of the antennas 10A, 10B, 10C; the distance between 10A and 10B is equal to D=2R; the antenna 10C is located on the bisector between 10A and 10B.

In the embodiment of FIGS. 7 and 8, the first receiver M1 calculates, relative to the antennas 10A and 10B to which it is connected, the plurality of first differences $\theta i_{21}$ in phase or in argument (that is, the first phase differences $\theta 0_{21}$, $\theta 1_{21}$, ..., $\theta N_{21}$) of respectively the plurality of paths TRi (that is, the paths TR0, TR1, ..., TRN), as is described hereinabove for the receiver 100 for $\theta i$.

The second receiver M2 calculates, relative to the antennas 10A and 10C to which it is connected, the plurality of second differences $\theta i_{31}$ in phase or in argument (that is, the second phase differences $\theta 0_{31}$, $\theta 1_{31}$, ..., $\theta N_{31}$) of respectively the plurality of paths TRi (that is, the paths TR0, TR1, ..., TRN), as is described hereinabove for the receiver 100 for $\theta i$.

The third receiver M3 calculates, relative to the antennas 10B and 10C to which it is connected, the plurality of third differences $\theta i_{23}$ in phase or in argument (that is, the third phase differences $\theta 0_{23}$, $\theta 1_{23}$, ..., $\theta N_{23}$) of respectively the plurality of paths TRi (that is, the paths TR0, TR1, ..., TRN), as is described hereinabove for the receiver 100 for $\theta i$.

The plurality of first differences in phase $\theta i_{21}$, the plurality of second differences in phase $\theta i_{31}$ and the plurality of third differences in phase $\theta i_{23}$ are sent to the conversion module 30, which converts them into a plurality of directions of arrival ($\alpha i$, $\phi i$) of the plurality of paths TRi in the orthonormal referential defined previously. This conversion module 30 can be provided instead of the conversion module 17 of FIG. 3. The conversion module 30 is connected to the module 18 for determination of the position P of the transmitter 2 from the directions of arrival ($\alpha i$, $\phi i$) of the paths TRi calculated by the conversion module 30.

In another embodiment, only the modules M1 and M2 can be provided and only the plurality of first differences in phase $\theta i_{21}$ and the plurality of second differences in phase $\theta i_{31}$ can be sent to the conversion module 30 for converting these differences in phase $\theta i_{21}$ and $\theta i_{31}$ into angles of arrival $\alpha i$, $\phi i$ associated with paths TRi, wherein the module M3 and/or the third differences in phase $\theta i_{23}$ may be omitted in this case.

In an embodiment, at least one first difference in phase $\theta i_{21}$, at least one second difference in phase $\theta i_{31}$ and optionally at least one third difference in phase $\theta i_{23}$, which have been determined for the same path Tri, are used to calculate N directions of arrival ($\alpha i$, $\phi i$). These phase differences determined for the same path TRi other than the direct paths TR0 can be used, for example.

Given that the distances between the antennas are small relative to the distances d1, d2, d3 of the antennas relative to the transmitter 2, the difference in arrival time of the same path TRi at the antennas 10A, 10B, 10C (for example of the order of 125 ps for a distance between the antennas of 3.75 cm) is less than the time precision of the receivers (for example of the order of a nanosecond), such that the path TRi is received quite simultaneously at the antennas. Consequently, a first difference in phase $\theta i_{21}$, a second difference in phase $\theta i_{31}$ and a third difference in phase $\theta i_{23}$ correspond to the same particular path TRi, when they have been determined at the same time or at very close instants by their respective receiver M1, M2, M3 (supposing a computing time of each phase difference substantially constant in each receiver), which enables to distinguish them from the differences in phase $\theta i$ of the other paths, which will have been determined at instants much further apart than the instant for determination of the differences in phase for this particular path TRi, as seen in FIGS. 4A, 4B and 4C.

The conversion module 30 calculates the angles $\alpha i$ and $\phi i$ of polar coordinates as a function of the first difference in phase $\theta i_{21}$, of the second difference in phase $\theta i_{31}$ and of the third difference in phase $\theta i_{23}$ angles calculated (or of two of these three differences in phase $\theta i_{21}$, $\theta i_{31}$ and $\theta i_{23}$) for each path TRi and as a function of the known positions of the antennas 10A, 10B and 10C.

Hereinbelow, given by way of illustration and in a non-limiting manner, is an example of a calculation performed by the conversion module 30, applied to the embodiment indicated hereinabove for FIG. 7, for which there is:

$$\begin{cases} d_1 = d + R\cos\varphi\cos\alpha \\ d_2 = d - R\cos\varphi\cos\alpha \\ d_3 = d - R\sin\varphi \end{cases}$$

From the first calculated difference in phase $\theta i_{21}$ and the second calculated difference in phase $\theta i_{31}$, a corresponding estimation of the angles $\alpha i$ and $\phi i$ is constructed for each path TRi by the following relations, in which the indices (i) have not been put in for the sake of conciseness, that is, they have to be replaced:

$\hat{\alpha}$ by $\alpha i$,
$\hat{\varphi}$ by $\phi i$,
$\hat{\theta}_{31}$ by $\theta i_{31}$,
$\hat{\theta}_{21}$ by $\theta i_{21}$.

$$\begin{cases} \hat{\varphi} = \sin^{-1}\left(\frac{2c}{D\omega}(2\hat{\theta}_{31} - \hat{\theta}_{21})\right) \\ \hat{\alpha} = \cos^{-1}\left(\frac{2c}{D\omega}\frac{\hat{\theta}_{21}}{\sqrt{1 - \frac{4c^2}{\omega^2 D^2}(2\hat{\theta}_{31} - \hat{\theta}_{21})^2}}\right) + k\pi \end{cases}$$

The system presented in FIG. 8 is a possible implementation of the method described hereinabove. It uses three radio receiving devices M1, M2 and M3 for estimating from signals coming from two antennas a phase difference between said signals. The estimations in phase difference are collected and processed in a computing unit which performs the estimation function of angles $\alpha$ and $\phi$.

The module 30 can for example be provided in the base station 110.

In this embodiment, the module 18 can determine the probable location P of the RFID transmitter 2 in a three-dimensional space by considering the problem of the line of the inverse paths INVTRi in space from directions of arrivals in spherical coordinates ($\alpha i$, $\phi i$) of the paths TRi at one or more base stations 110.

In the description of the module 18 hereinabove the references to the angles of incidence ANGi are substituted by references to the directions of arrival in spherical coordinates ($\alpha i$, $\phi i$). The position and orientation of the reflecting surfaces REF are supposed to be known in space and the probable position of the transmitter P determined by the module 18 is expressed in three-dimensional space.

In an embodiment, the antennas 10A, 10B and 10C have first, second and third positions, which are predetermined and known relative to the casing 111 of the base station 110. The orientations of the antennas 10A, 10B and 10C are also predetermined and known relative to the casing 111 associated with the base station 110.

In an embodiment, the module 18 can utilise the angles of arrival in spherical coordinates ($\alpha i$, $\phi i$) of the different paths TRi supplied by the module 30 of a single base station 110 for determining the probable position in space of the transmitter 2.

In another embodiment, the module 18 can use the angles of arrival in spherical coordinates calculated by a module or modules 30 from the angles of incidence of multiple propagation paths relative to the antennas 10A, 10B and 10C of respectively several base stations 110 for determining the probable position of the transmitter 2 in space.

The invention claimed is:

1. A receiver comprising:
   a first estimation module;
   a second estimation module;
   a third extraction module;
   a fourth module; and
   at least one conversion module;
   wherein the receiver is connected to at least one first antenna configured to receive an emitted signal, the emitted signal emitted wirelessly by an RFID transmitter in an environment involving one or more signal propagation path relative to the receiver and connected to at least one second antenna configured to receive the emitted signal,
   the at least one first antenna and the at least one second antenna being connected in the receiver to respectively a first receiving part supplying a first channel signal as a function of the emitted signal and connected to a second receiving part supplying a second channel signal as a function of the emitted signal,
   the at least one first antenna defining a first receiving channel for receiving of the emitted signal,
   the at least one second antenna defining a second receiving channel for receiving of the emitted signal,
   the at least one first antenna- and the at least one second antenna being at a distance from each other and respectively having first and second predetermined positions relative to each other such that the first receiving channel is substantially identical to the second receiving channel,
   wherein the emitted signal is of the ultra-wide band type, and
   the first estimation module is configured to estimate a first complex impulse response of the first receiving channel to the emitted signal as a function of the emitted signal and of the first channel signal,
   the second estimation module is configured to estimate a second complex impulse response of the second receiving channel to the emitted signal as a function of the emitted signal and of the second channel signal,
   the third extraction module is configured to extract from the first complex impulse response one or more first time component associated respectively with the one or more signal propagation path arriving at the at least one first antenna and to extract from the second complex impulse response one or more second time component associated respectively with the one or more of signal propagation path arriving at the at least one second antenna,
   the fourth module is configured to calculate one or more argument difference between an argument of the one or more first time component of the first complex impulse response and an argument of the one or more second time component of the second complex impulse response respectively for the one or more signal propagation path, and
   the at least one conversion module is configured to convert each argument difference into an angle of arrival of each signal propagation path relative to the receiver.

2. The receiver according to claim 1, further comprising a first converter configured to convert the emitted signal being a radio frequency signal received by the at least one first antenna into the first channel signal in base band sent to the first estimation module and a second converter configured to convert the emitted signal being a radio frequency signal received by the at least one second antenna into the second channel signal in base band sent to the second estimation module.

3. The receiver according to claim 2, further comprising at least one analog-to-digital converter configured to convert the first channel signal in base band into the first channel signal in digital base band sent to the first estimation module and to convert the second channel signal in base band respectively into the second channel signal in digital base band sent to the second estimation module.

4. The receiver according to claim 1, wherein the first estimation module is configured to calculate the first complex impulse response by making a correlation between the first channel signal and a signal calculated by circular permutations of a sequence contained in the emitted signal, the second estimation module is configured to calculate the second complex impulse response by making a correlation between the second channel signal and the signal calculated by circular permutations of the sequence contained in the emitted signal.

5. The receiver according to claim 4, wherein the sequence contained in the emitted signal is pre-registered in the device.

6. The receiver according to claim 4, wherein the sequence contained in the emitted signal is a sequence of pulses present in a synchronisation heading of a preamble of the emitted signal.

7. The receiver according to claim 1, wherein the conversion module is configured to calculate each angles of arrival ANGi of each signal propagation paths relative to the receiver according to the following equation:

$$\text{ANG}i = \arccos((\arg(hiA) - \arg(hiB)) \cdot c / (\omega \cdot D)),$$

wherein:
arg(hiA)−arg(hiB) is the argument differences between the argument arg(hiA) of each first time component of the first complex impulse response and the argument arg(hiB) of each second time component of the second complex impulse response respectively for each signal propagation paths,
$\omega$ is the pulsation corresponding to a central emission frequency of the emitted signal,
D is a separation distance between the at least one first antenna and the at least one second antenna, and
c is the speed of light.

8. The receiver according to claim 1, wherein the at least one first antenna and the at least one second antenna are at a distance from each other by a distance equal to a wavelength of an emission frequency of the emitted signal.

9. The receiver according to claim 1, wherein the conversion module is configured to convert each argument differences into each angle of arrival in a determined two-dimensional plan.

10. The receiver according to claim 9, comprising as antennas only a single first antenna and a single second antenna.

11. The receiver according to claim 1, wherein the conversion module is configured to convert each argument differences into each angle of arrival which is three-dimensional.

12. The receiver according to claim 1, wherein the first and second estimation modules are configured to calculate the first and second complex impulse responses in the form of first and second multiplicities of samples in discrete time,
the extraction module configured to select each first time component associated respectively with each signal propagation path among the first multiplicity of samples of the first complex impulse response, and
the extraction module configured to select each second time component associated respectively with each signal propagation path among the second multiplicity of samples of the second complex impulse response.

13. The receiver according to claim 12, wherein the extraction module is configured to select the first and second time components by retaining the first and second samples which are non-zero in absolute value or greater in absolute value than a prescribed non-zero threshold.

14. The receiver according to claim 12, wherein the first multiplicity of samples $hnA = \widetilde{\widetilde{H_{A,n}}}$ of the first complex impulse response and the second multiplicity of samples $hnB = \widetilde{\widetilde{H_{B,n}}}$ of the second complex impulse response are configured to be calculated according to the following formulas:

$$\widetilde{\widetilde{H_{A,n}}} = \sum_{k=0}^{K-1} \sum_{m=0}^{L-1} \tilde{y}_{A,(n\,mod\,S)+m.s+k.L.S} \cdot C_{(L+m-\lceil \frac{n}{S} \rceil)\,mod\,L}$$

$$\widetilde{\widetilde{H_{B,n}}} = \sum_{k=0}^{K-1} \sum_{m=0}^{L-1} \tilde{y}_{B,(n\,mod\,S)+m.s+k.L.S} \cdot C_{(L+m-\lceil \frac{n}{S} \rceil)\,mod\,L}$$

wherein:
n is the discrete time variable on the samples,
$C = \{C_0; C_1; \ldots C_{L-1}\}$ is a sequence of L elementary pulses of period $T_S = S \cdot T_c$ seconds between the successive pulses of the sequence C contained in the emitted signal,
L is a natural non-zero integer,
mod L designates the modulo L operator,
$T_c$ is the duration of each pulse,
K is the number of repetitions of the sequence C, $\lceil \frac{n}{S} \rceil$ designates the integer part or n/S, rounded up to the next integer,
S is a prescribed integer,
n is a non-zero integer between 1 and L×S,
$y_{A,n} = \tilde{y}_{A,n}$ designates the samples of the complex digital signal of the first receiving part in base band, and
$y_{B,n} = \tilde{y}_{B,n}$ designates the samples of the complex digital signal of the second receiving part in base band.

15. The receiver according to claim 1, wherein the receiver comprises a single local oscillator shared between the first receiving part and the second receiving part.

16. The receiver according to claim 15, wherein the physical arrangement of the first receiving channel and of the second receiving channels is done symmetrically relative to the oscillator placed on an axis of symmetry.

17. The receiver according to claim 2, wherein the receiver comprises a single local oscillator shared between the first receiving part and the second receiving part, with the physical arrangement of the first converter and of the second converter being done symmetrically relative to the oscillator placed on an axis of symmetry.

18. The receiver according to claim 1, wherein the module to determine the location of the transmitter calculates this location of the RFID transmitter as a function of pre-registered coordinates of elements of the environment reflecting the emitted signal and as a function of each angle of arrival of each signal propagation paths.

19. A method for location of an RFID transmitter in an environment involving one or more signal propagation path for propagation of an emitted signal, the emitted signal emitted wirelessly by an RFID transmitter, by means of at least one receiver, the method comprising:
receiving the emitted signal on at least one first receiving antenna of the at least one receiver and at least one second receiving antenna of the at least one receiver, the at least one first receiving antenna defining a first receiving channel for receiving of the emitted signal, the at least one second receiving antenna defining a second receiving channel for receiving of the emitted signal, the at least one first receiving antenna and the at least one second receiving antenna being at a distance from each other and respectively having first and second predetermined positions relative to each other such that the first receiving channel is substantially identical to the second receiving channel, and the emitted signal being of the ultra-wide band type;
estimating, by a first estimation module of the at least one receiver, a first complex impulse response of the first receiving channel to the emitted signal as a function of the emitted signal and of a first channel signal supplied by a first receiving part of the at least one receiver;
estimating, by a second estimation module of the at least one receiver, a second complex impulse response of the second receiving channel to the emitted signal as a function of the emitted signal and of a second channel signal supplied by a second receiving part of the at least one receiver;
extracting, by a third extraction module of the at least one receiver, one or more first time components associated respectively with one or more signal propagation path arriving at the at least one first receiving antenna from the first complex impulse response, and one or more second time components associated respectively with the one or more signal propagation path arriving at the at least one second receiving antenna from the second complex impulse response;
calculating, by a fourth module of the at least one receiver, one or more argument differences between an argument of each first time component of the first complex impulse response and an argument of each second time component of the second complex impulse response respectively for one or more signal propagation path; and
converting, by at least one conversion module of the at least one receiver, the one or more argument differences into one or more angle of arrival of the one or more signal propagation path relative to the at least one receiver.

20. The method of claim 19, wherein a location of the RFID transmitter is determined from a plurality of angles of arrival of a plurality of signal propagation paths.

21. The receiver of claim 1, comprising at least one determination module configured to determine a location of the RFID transmitter from the one or more angle of arrival.

22. A device for locating an RFID transmitter in an environment involving one or more signal propagation path of an emitted signal, the emitted signal emitted wirelessly by an RFID transmitter, wherein the device comprises:
- at least one first receiver according to the receiver in claim 1, the at least one first receiver connected to the at least one first antenna and to the at least one second antenna for calculating, as argument difference, one or more of first argument difference respectively for the one or more signal propagation path;
- at least one third antenna located in a third predetermined position; and
- at least one second receiver connected to the at least one first antenna and to the at least one third antenna for calculating, as argument difference, one or more second argument difference respectively for the one or more signal propagation path,
- the first predetermined position of the at least one first antenna, the second predetermined position of the at least one second antenna and the third predetermined position of the at least one third antenna being non-aligned, and
- the conversion module configured to convert the one or more first argument difference and the one or more second argument difference respectively into one or more angle of arrival of the one or more signal propagation path relative to the receivers.

23. The device according to claim 22, wherein the device further comprises, as receiver, at least one third receiver connected to the third antenna and to the second antenna for calculating one or more third argument difference respectively for the one or more signal propagation path,
- the conversion module configured to convert the one or more first argument difference, the one or more second argument difference and the one or more third argument difference respectively into one or more angle of arrival of the one or more signal propagation path relative to the receivers.

* * * * *